(12) United States Patent
Christie et al.

(10) Patent No.: US 10,506,754 B2
(45) Date of Patent: *Dec. 17, 2019

(54) VARIABLE TOOTH COULTER BLADE WITH SIZED INSERTS

(71) Applicant: Prescription Tillage Technology, LLC

(72) Inventors: Richard L. Christie, Clarinda, IA (US); Ryan J. K. Christie, Clarinda, IA (US); John D. Nance, Ringoes, NJ (US)

(73) Assignee: PRESCRIPTIONA TILLAGE TECHNOLOGY, LLC, Clarinda, IA (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/998,442

(22) Filed: Jan. 4, 2016

(65) Prior Publication Data

US 2016/0227696 A1   Aug. 11, 2016

Related U.S. Application Data

(63) Continuation-in-part of application No. 14/961,849, filed on Dec. 7, 2015, which is a continuation of
(Continued)

(51) Int. Cl.
*A01B 23/06* (2006.01)
*A01B 15/18* (2006.01)

(52) U.S. Cl.
CPC .............. *A01B 15/18* (2013.01); *A01B 23/06* (2013.01)

(58) Field of Classification Search
CPC ..... A01B 33/10; A01B 33/103; A01B 33/106; A01B 15/18; A01B 15/16; A01B 23/06;
(Continued)

(56) References Cited

U.S. PATENT DOCUMENTS

| 202,624 | A | * | 4/1878 | Augspurger | ......... | A01B 33/103 |
| | | | | | | 172/555 |
| 615,005 | A | | 11/1898 | Walquist | ......... | 83/676 |

(Continued)

FOREIGN PATENT DOCUMENTS

FR       2570317 B1 *  7/1994  ............. A01D 34/73

OTHER PUBLICATIONS

"Notification of Transmittal of International Search Report and the Written Opinion of the International Searching Authority, or the Declaration", for PCT/US16/00004, dated Apr. 11, 2016, Issued by the International Searching Authority of the Patent Cooperation Treaty.

*Primary Examiner* — Matthew Troutman
(74) *Attorney, Agent, or Firm* — Ernest D. Buff & Associates, LLC; Ernest D. Buff; Margaret A. La Croix

(57) ABSTRACT

A system and method cuts and increases surface area of surface stubble material while contemporaneously mulching, tiling and aerating the soil. A discoidal coulter blade is configured with a plurality of circumferential teeth for cutting the surface stubble as well as reducing the downward pressure required for the blade to enter the type and depth of soil desired. The circular coulter blade is configured with a plurality of inserts oriented normal to the rotational movement of the blade as the blade cuts the soil. Each insert is shaped to aerate a specific type of soil anticipated by an operator. The inserts are positioned on the blade for desired impact with the soil and angled in placement on the blade to maintain the desired effect on the soil.

40 Claims, 43 Drawing Sheets

Related U.S. Application Data application No. 14/590,855, filed on Jan. 6, 2015, now Pat. No. 9,204,588, which is a continuation of application No. 14/162,259, filed on Jan. 23, 2014, now abandoned.

(60) Provisional application No. 61/756,841, filed on Jan. 25, 2013.

(58) Field of Classification Search
CPC ...... B23D 61/025; B28D 1/121; B28D 1/122; B02C 18/182
USPC .......................... 172/555, 604, 540; 241/295
See application file for complete search history.

(56) References Cited

U.S. PATENT DOCUMENTS

| | | | |
|---|---|---|---|
| 814,716 A | 3/1906 | MacDonell | 111/33 |
| 994,707 A | 6/1911 | Meissner | 111/84 |
| 1,186,880 A | 6/1916 | Canda | 172/555 |
| 1,873,128 A * | 8/1932 | Johnson | A01C 5/062 |
| | | | 111/140 |
| 2,084,055 A | 6/1937 | Cascadden | 172/144 |
| 2,357,528 A | 9/1944 | Lutes | 172/144 |
| 2,596,574 A | 5/1952 | Lutes | 172/555 |
| 3,995,699 A * | 12/1976 | Blucher | A01B 15/16 |
| | | | 172/719 |
| 4,047,576 A * | 9/1977 | Rau | A01B 29/041 |
| | | | 172/120 |
| 5,197,453 A | 3/1993 | Messina | 125/15 |
| 5,285,768 A | 2/1994 | Messina | 125/15 |
| 5,346,020 A | 9/1994 | Bassett | 172/540 |
| 5,497,717 A * | 3/1996 | Martin | A01C 5/066 |
| | | | 111/140 |
| 5,497,836 A * | 3/1996 | Groff | A01C 7/006 |
| | | | 172/555 |
| 5,704,431 A * | 1/1998 | Lefebvre | A01C 5/068 |
| | | | 111/194 |
| 5,884,547 A * | 3/1999 | Carlsen | B23D 45/00 |
| | | | 30/166.3 |
| 6,427,573 B1 * | 8/2002 | Carlsen | B23D 61/021 |
| | | | 30/166.3 |
| 7,055,515 B2 | 1/2006 | Bishop | 125/13.01 |
| 7,063,165 B2 * | 6/2006 | Bowsher | A01B 35/28 |
| | | | 172/21 |
| 7,575,066 B2 | 8/2009 | Bauer | 172/540 |
| 7,832,345 B2 * | 11/2010 | Whalen | A01C 5/066 |
| | | | 111/140 |
| 8,186,450 B2 | 5/2012 | Bauer | 172/540 |
| 8,596,375 B2 * | 12/2013 | Winick | A01C 5/064 |
| | | | 111/140 |
| 8,627,898 B2 | 1/2014 | Nance | 172/146 |
| 8,826,836 B2 * | 9/2014 | Van Buskirk | A01C 7/006 |
| | | | 111/140 |
| 8,875,640 B1 * | 11/2014 | Reed | A01C 21/002 |
| | | | 111/119 |
| 8,939,095 B2 * | 1/2015 | Freed | A01B 49/027 |
| | | | 111/164 |
| 9,204,588 B1 * | 12/2015 | Christie | A01B 23/06 |
| 9,517,571 B2 * | 12/2016 | Wilhelm | B26D 1/0006 |
| 2008/0173220 A1 | 7/2008 | Wertz | 111/22 |
| 2008/0245440 A1 | 10/2008 | Paumier | 144/235 |
| 2011/0240319 A1 | 10/2011 | Sanderson | 172/604 |
| 2014/0345893 A1 * | 11/2014 | Christie | A01B 15/18 |
| | | | 172/599 |

\* cited by examiner

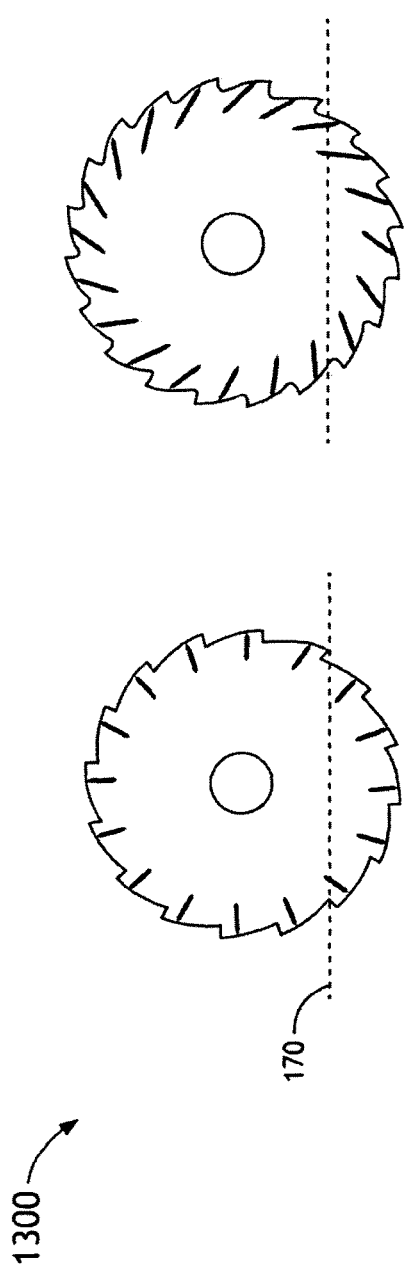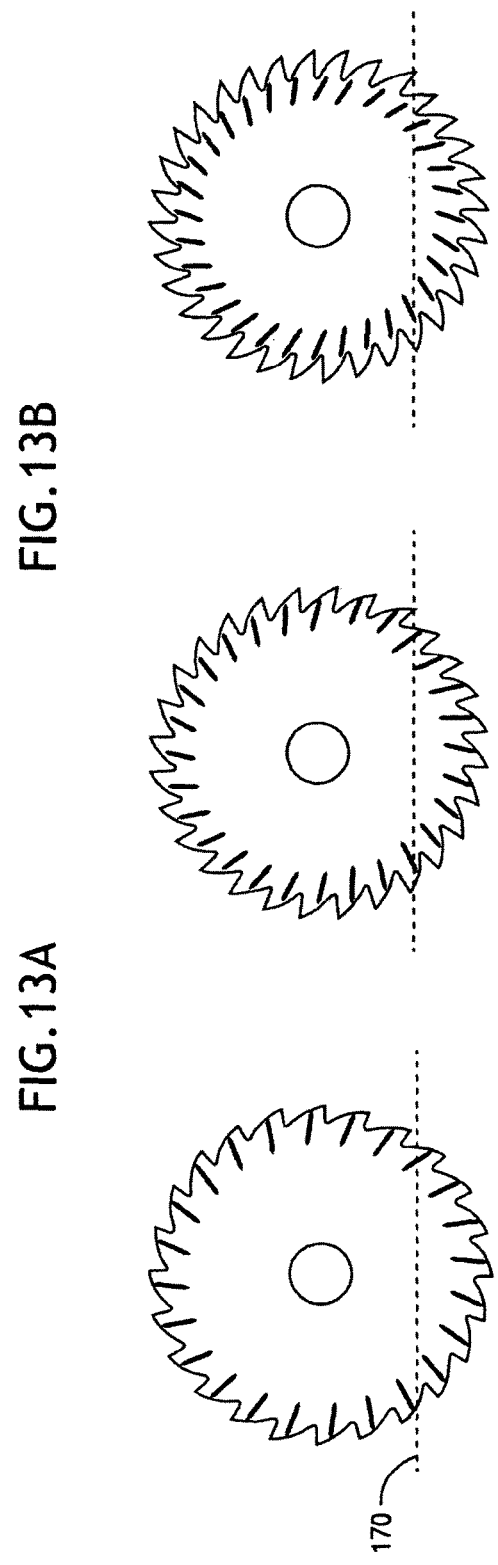

1500

170

170

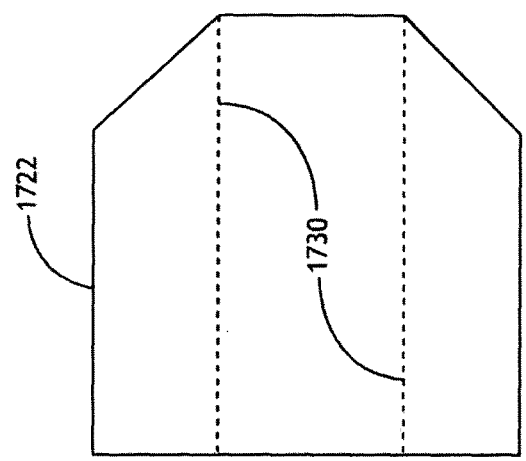
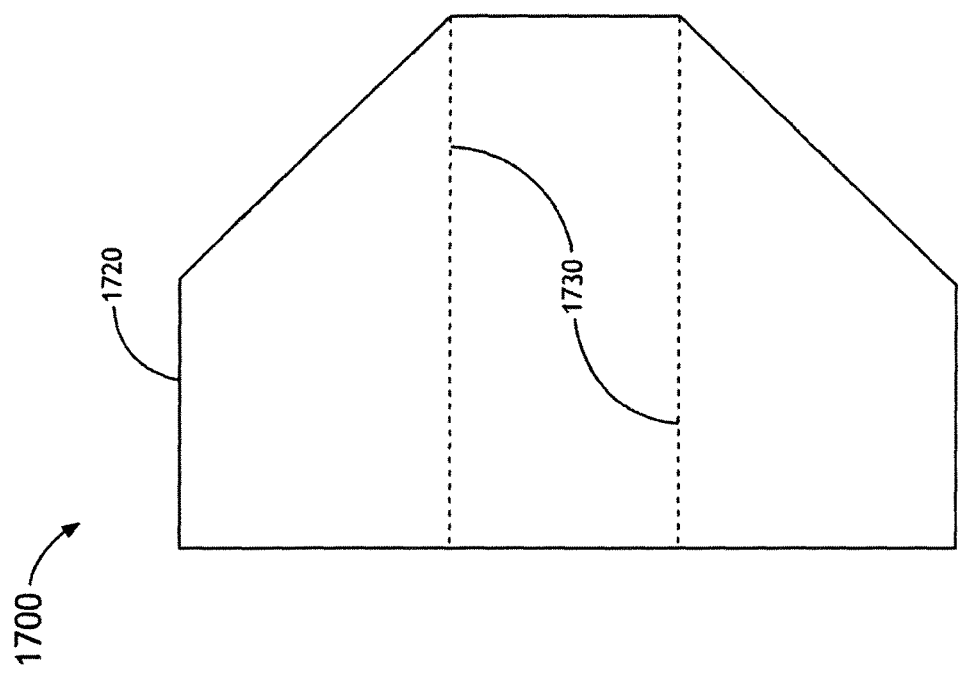

2100

2102 — embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement

2104 — translating the discoidal coulter blade through the soil at a depth via the implement

2106 — cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge

2108 — aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil

FIG. 21

Bubble Blade Insert

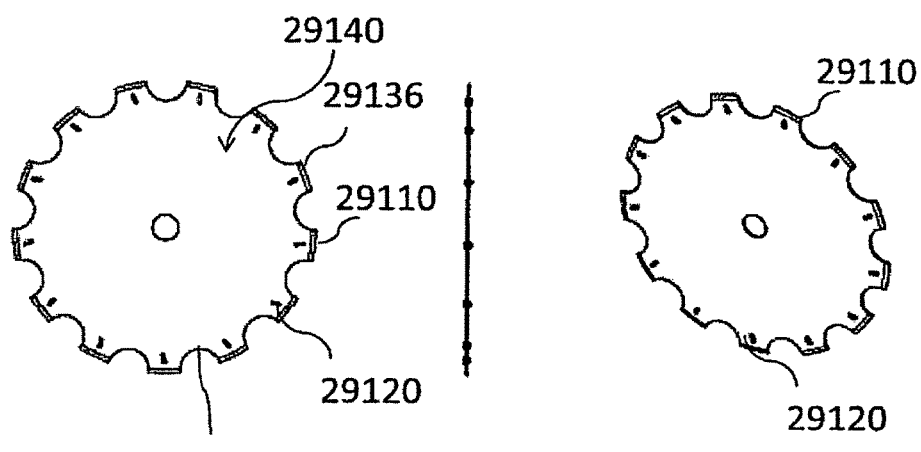
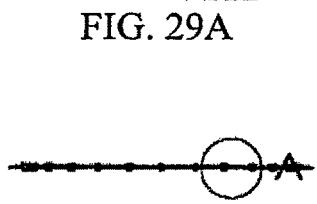
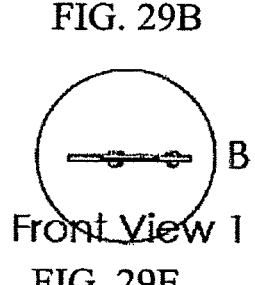
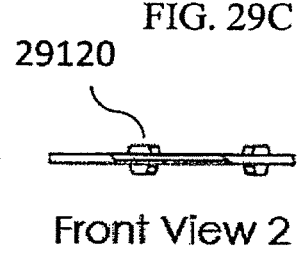
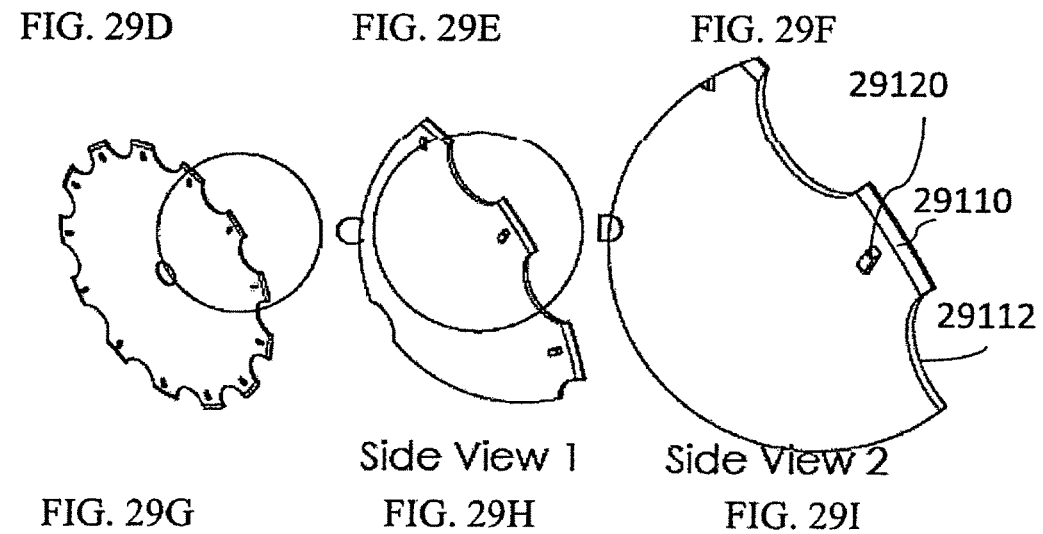
Notch Blade Insert

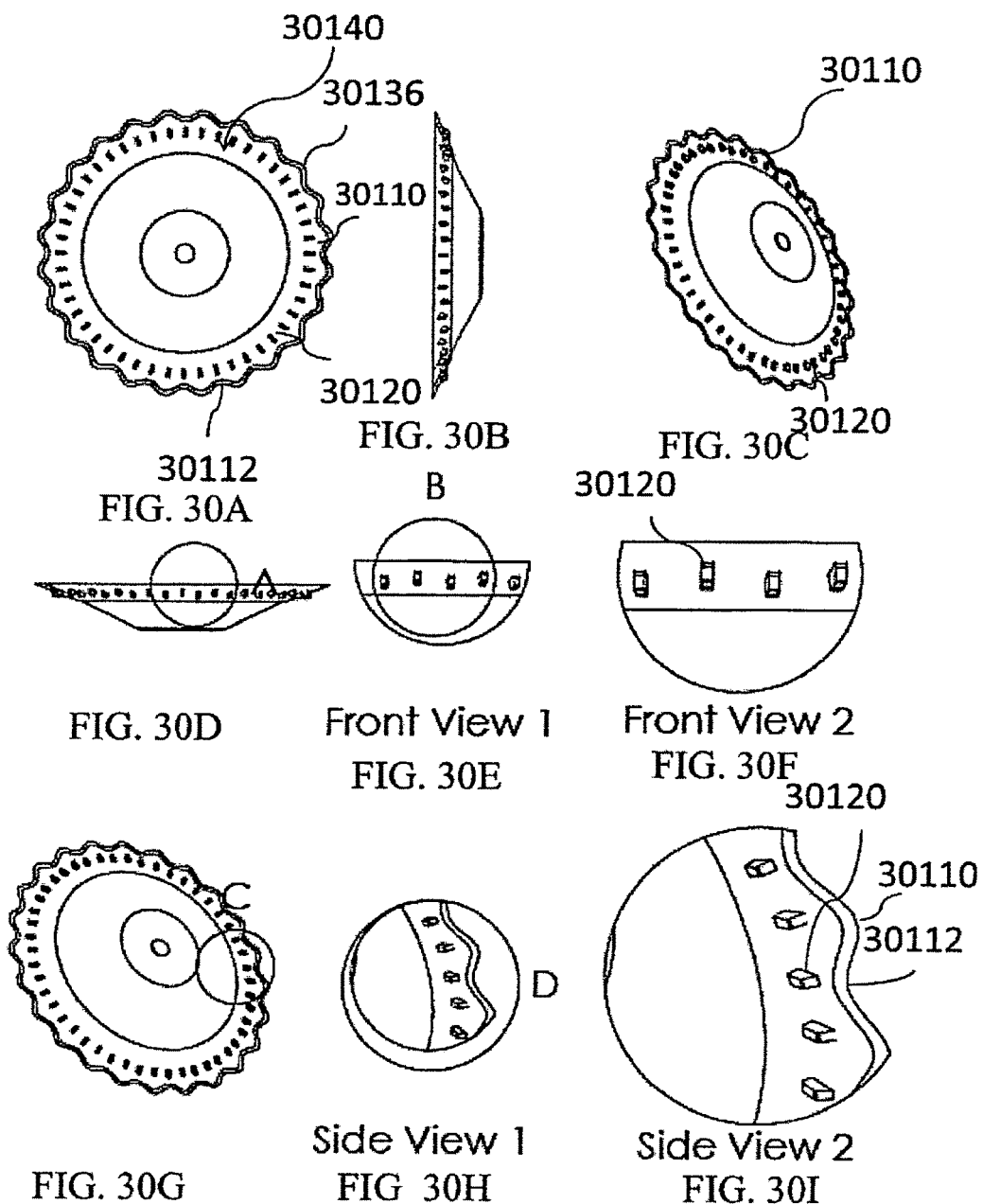
Razor Blade Insert

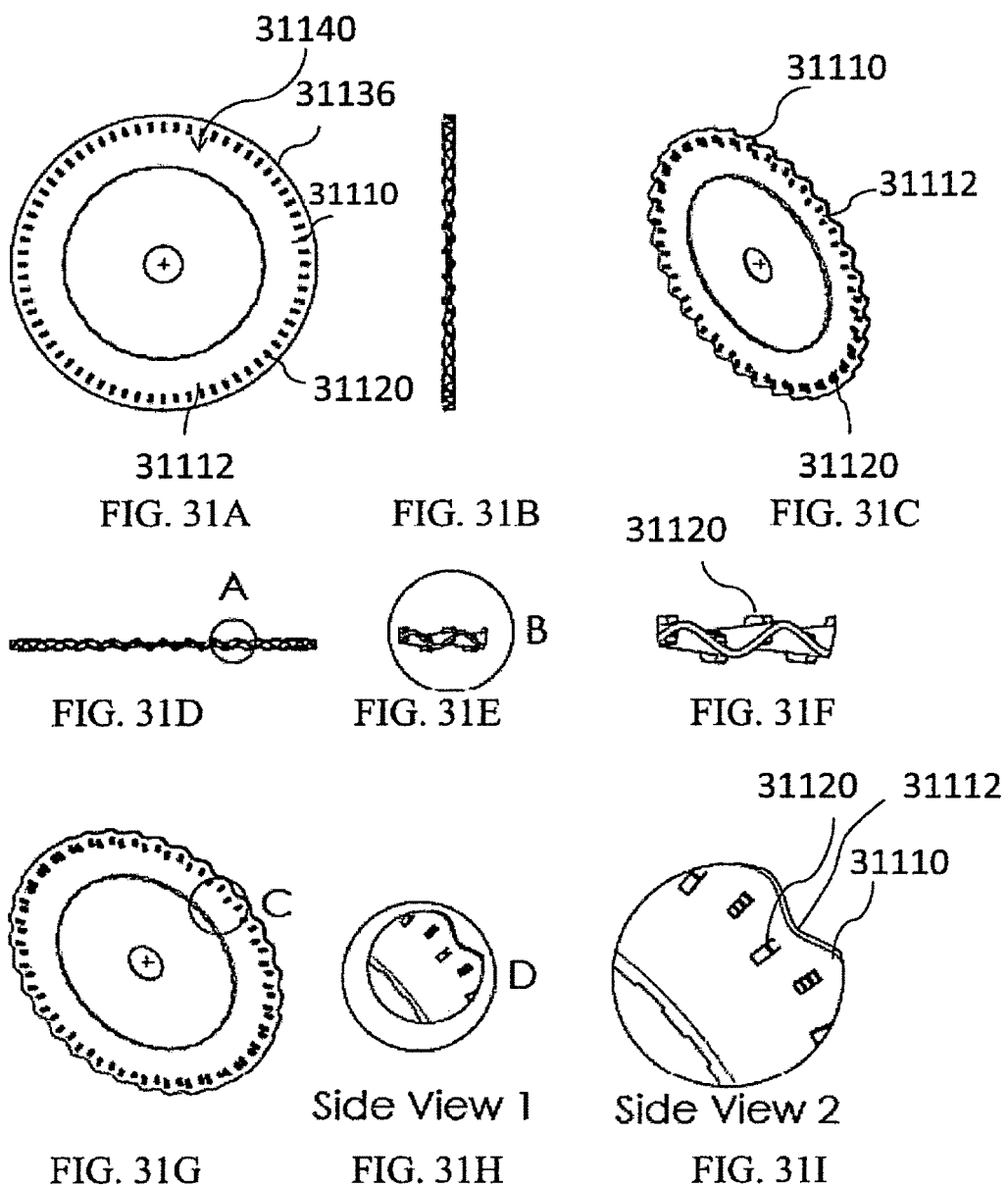
Ripple Blade Insert

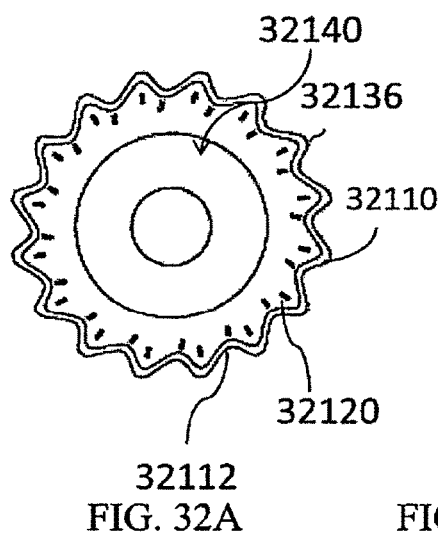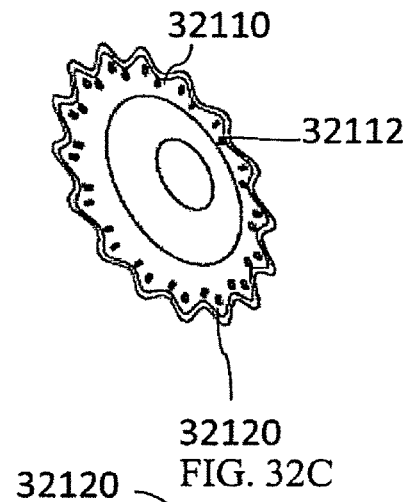
FIG. 32A  FIG. 32B  FIG. 32C
  
FIG. 32D  FIG. 32E  FIG. 32F
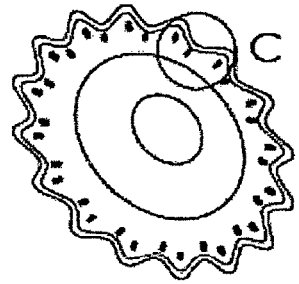 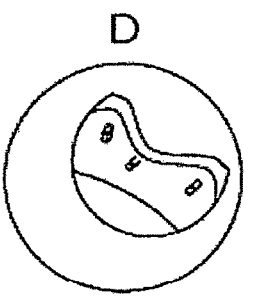 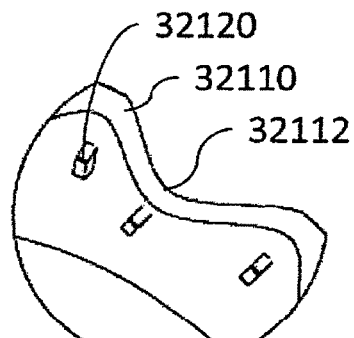
FIG. 32G  Side View 1 FIG. 32H  Side View 2 FIG. 32I
Sameri Blade Insert

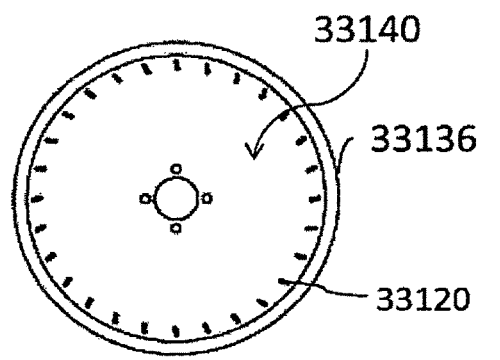
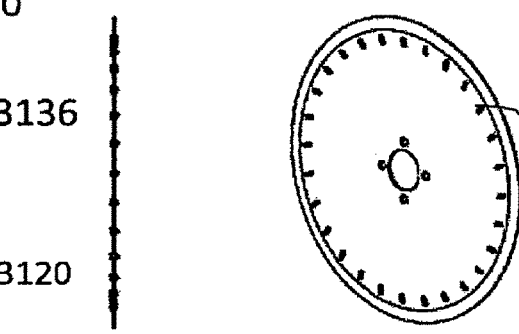
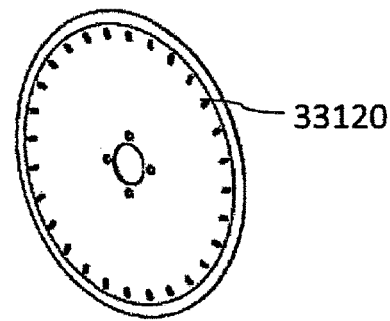
FIG. 33A     FIG. 33B     FIG. 33C
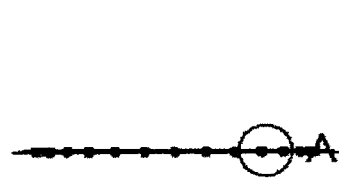
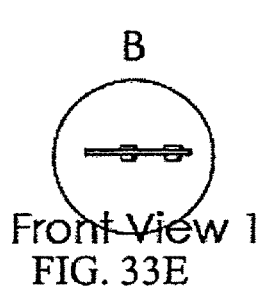
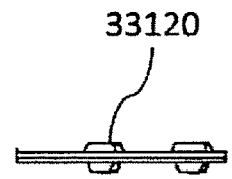
FIG. 33D     Front View 1 FIG. 33E     Front View 2 FIG. 33F
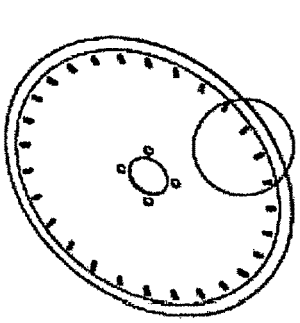
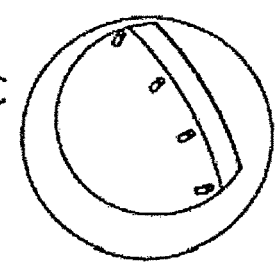
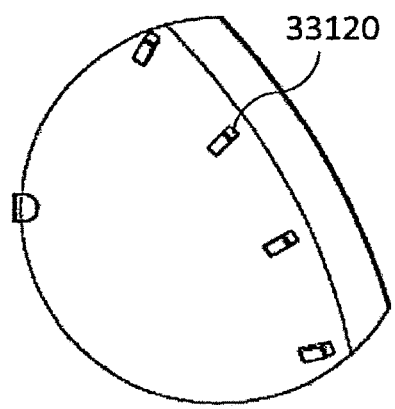
FIG. 33G     Side View 1 FIG. 33H     Side View 2 FIG. 33I
Straight Blade Insert

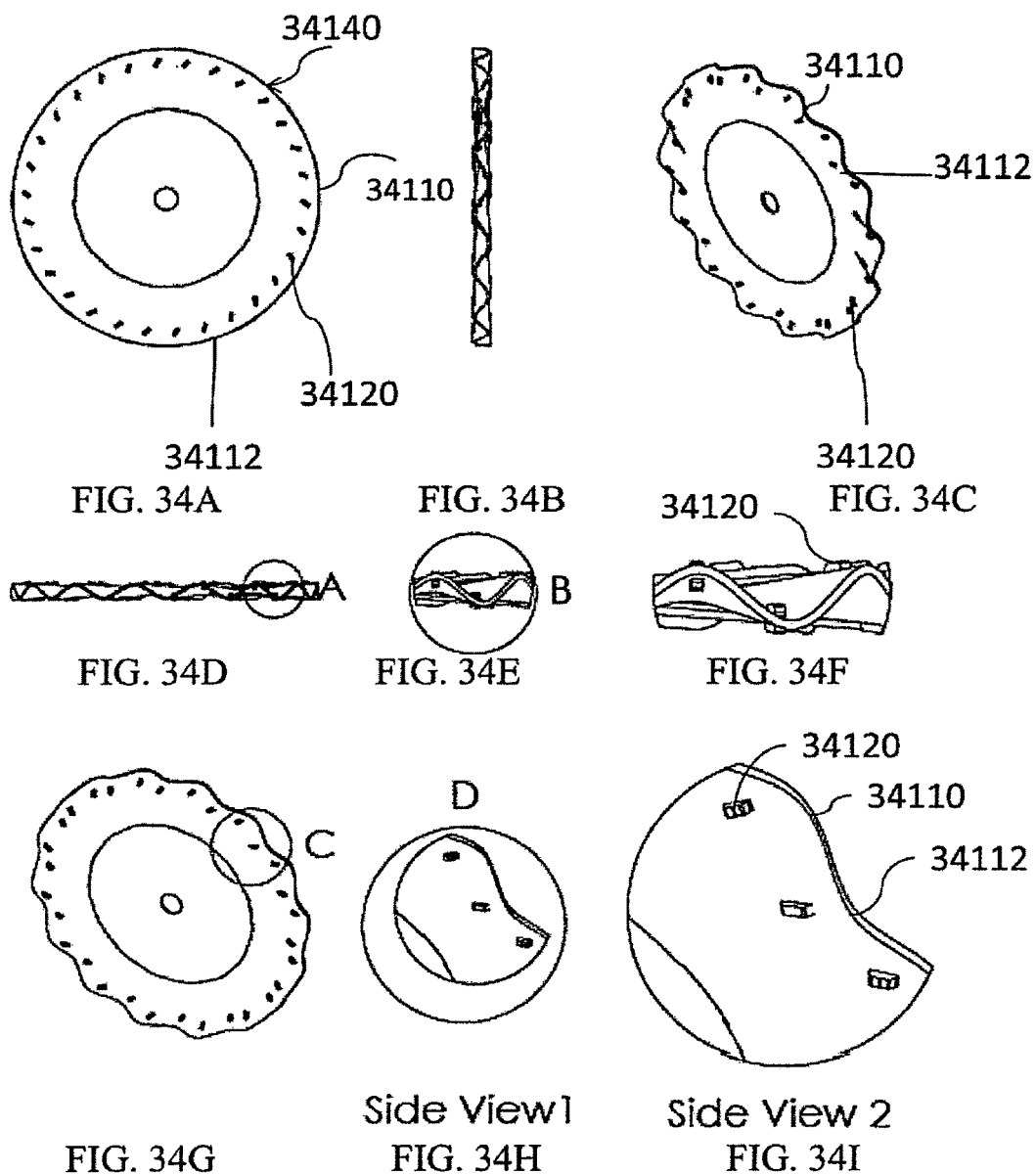
Turbo Blade Insert

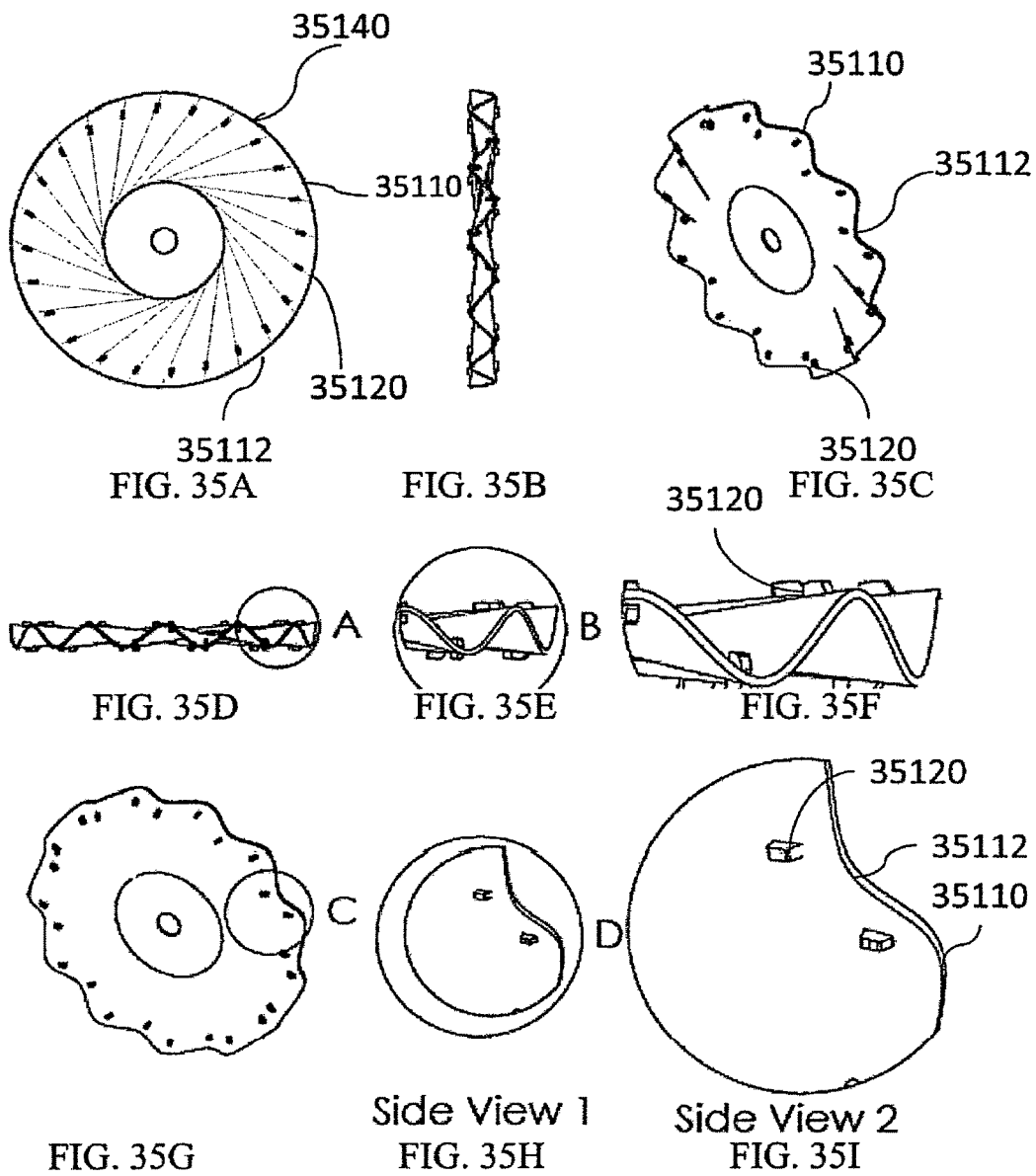
Vortec Blade Insert

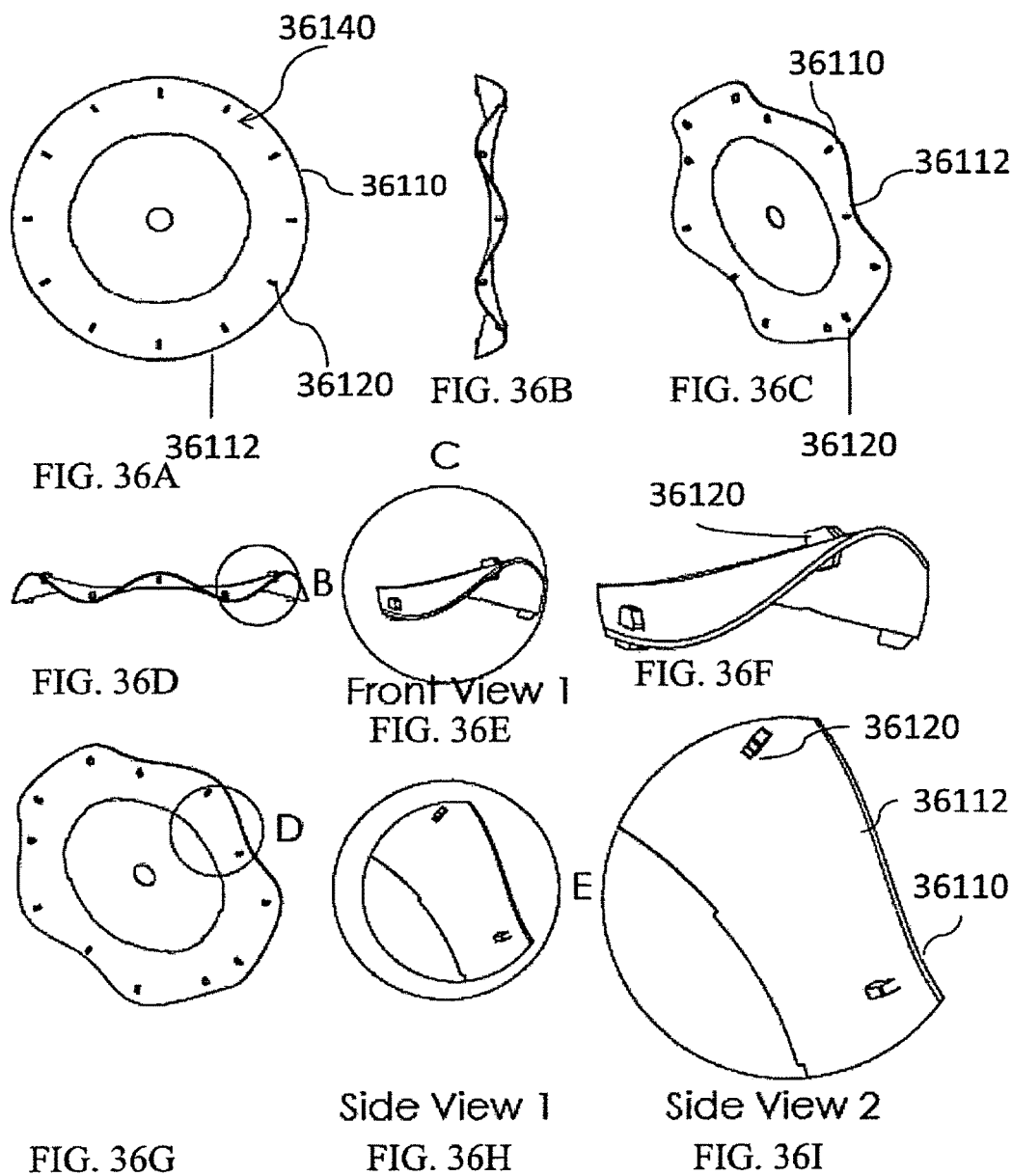
Wavy Blade Insert

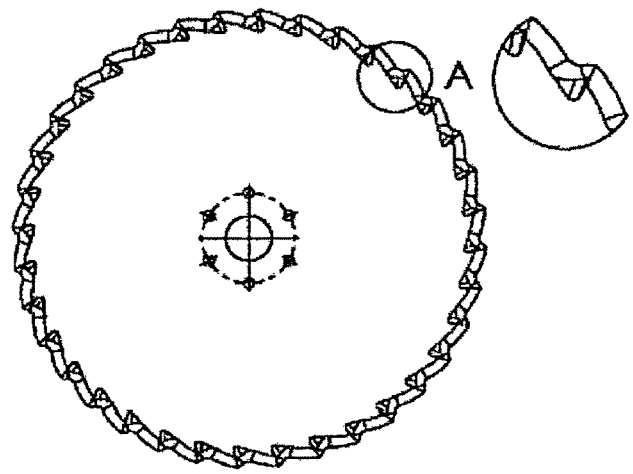
FIG. 37A   FIG. 37B
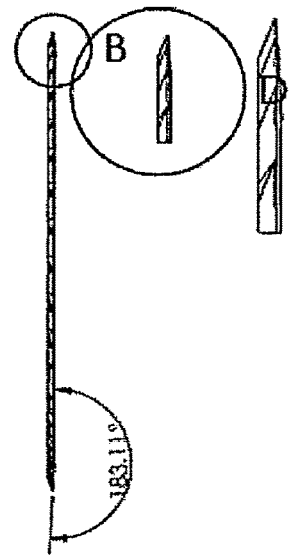
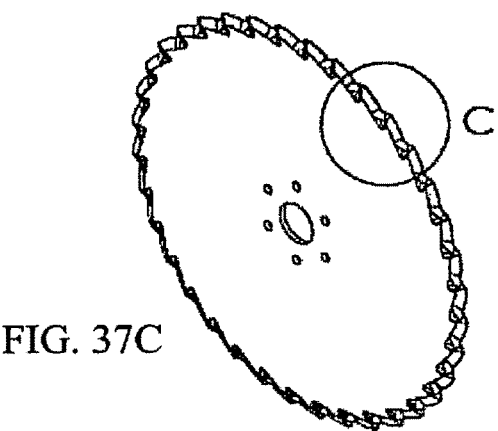
FIG. 37C
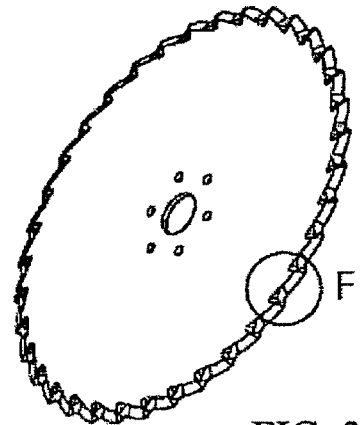
FIG. 37D
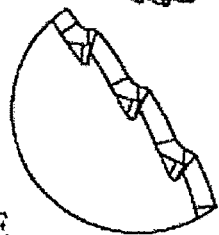
FIG. 37E
FIG. 37F
True V Extended Fillet
True V Mate Taper Serrated Cutting Edge Multiple Insert Blades Multiple Insert Blades Insert Soil Profile Example Serrated Edges

VARIABLE TOOTH COULTER BLADE WITH SIZED INSERTS

CROSS-REFERENCE TO RELATED APPLICATIONS

The present application is a continuation in part of U.S. patent application Ser. No. 14/961,849 filed Dec. 15, 2015 which is a continuation of U.S. patent application Ser. No. 14/590,855 filed Jan. 6, 2015, now U.S. Pat. No. 9,204,588, which is a continuation of U.S. patent application Ser. No. 14/162,259 filed Jan. 23, 2014, entitled VARIABLE TOOTH COULTER BLADE WITH SIZED INSERTS which claims the benefit under 35 U.S.C. § 119(e) of U.S. Provisional Application 61/756,841 filed Jan. 25, 2013 entitled "Variable Tooth Counter Blade with Sized Inserts", the entireties of which are hereby incorporated by reference thereto.

BACKGROUND OF THE INVENTION

1. Field of the Invention

The present invention relates generally to agriculture tillage equipment. More particularly, embodiments of the present invention relate to an efficient device for cutting surface stubble while simultaneously mulching, tilling and aerating the soil.

2. Description of the Prior Art

Traditional agriculture requires turning of the soil to effectively bury desirable stubble to create needed composted material. With the advent of reduced tillage and minimum tillage farming techniques, coulter blades may be used to increase surface area by cutting and reducing the stubble to a manageable enabling compost and reuse of the desirable stubble.

Soil compression is an undesirable effect of tillage equipment interaction with the soil. Vehicle wheels and traditional coulter blades may compress the soil with which they may interact. Soil compression may multiply over time leading to less root enhancement, less root travel, and a lesser amount of air in the soil. These continued effects may result in an eventual reduction of product available to an operator.

A Genetically Modified Organism (GMO) stubble may be more substantial than traditional cellulose or stubble. Such GMO stubble is difficult for existing tillage devices to cut. A desired outcome of tillage equipment is GMO stubble cut into smaller segments for ease of compost and eventual GMO breakdown.

Traditional coulter blades may be unable to effectively cut GMO stubble and create a "wave" of stubble in front of the blade causing an eventual plug. This plug requires the operator to stop work and physically remove the plug before continuing operation.

Therefore, a need exists for a blade designed to effectively cut regular stubble, the more substantial GMO stubble, green crop and cover crop while aerating, mulching and tiling the soil with a minimum amount of contact with the least amount of time.

SUMMARY OF THE INVENTION

Accordingly, an embodiment of the present invention is directed to a coulter blade for altering soil and surface stubble, comprising: a discoidal coulter blade configured with a blade hub and a blade circumference, the discoidal coulter blade having a plane parallel to each diameter line of the discoidal coulter blade, the blade hub configured for detachably mounting the discoidal coulter blade to an implement; a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge; a plurality of evenly spaced insert openings configured in a circular pattern at a first radius from the blade hub, the first radius being less than the blade circumference, each of the plurality of evenly spaced insert openings having an insert angle; a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a coulter blade wherein the cutting edge of a first half of the plurality of teeth is sharpened on a first lateral side and the cutting edge of a second half of the plurality of teeth is sharpened on a second lateral side, each tooth of the first half having two teeth of the second half planarly adjacent and each tooth of the second half having two teeth of the first half planarly adjacent, or the embodiment having a cutting edge on the same side of each tooth.

An additional embodiment of the present invention is directed to a coulter blade wherein the blade circumference is based at least on one of: a desired rotation speed, a soil type, a desired tooth depth, a desired insert depth and wherein the discoidal coulter blade is further configured with a plurality of drive openings proximal with the blade hub.

An additional embodiment of the present invention is directed to a coulter blade wherein the insert angle of each of plurality of evenly spaced insert openings is one of: equal and unequal and wherein the discoidal coulter blade is further configured with a second plurality of evenly spaced insert openings and an associated second plurality of securably mounted inserts located in a circular pattern at a second radius from the blade hub, the second radius less than the first radius.

An additional embodiment of the present invention is directed to a coulter blade wherein the plurality of teeth and the plurality of inserts are further configured for at least one of a specific soil type, a soil moisture content, a soil with embedded rocks, and a soil temperature.

An additional embodiment of the present invention is directed to a method for altering surface stubble and soil aeration, comprising: embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement; translating the discoidal coulter blade through the soil at a depth via the implement; cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge; simultaneously mulching, tilling and aerating the soil aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a system for altering surface stubble and soil aeration, comprising: an implement configured with a plurality of discoidal coulter blades, each of the plurality of discoidal coulter blades configured with a blade hub and a blade circumference, each of the plurality of discoidal coulter blades having a plane parallel to each diameter line of the discoidal coulter blade, the blade hub configured for detachably mounting the discoidal coulter blade to the implement, each of the plurality of discoidal coulter blades configured with a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge, each of the plurality of discoidal coulter blades configured with a plurality of evenly spaced insert openings configured in a circular pattern at a first radius from the blade hub, the first radius being less than the blade circumference, each of the plurality of evenly spaced insert openings having an insert angle, each of the plurality of discoidal coulter blades configured with a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a method for altering surface stubble and soil aeration utilizing concentrated friction and force in forward rotation and forward motion, comprising: means for embedding a discoidal coulter blade within the soil, the discoidal coulter blade configured with a blade hub and a blade circumference, the discoidal coulter blade having a plane parallel to each diameter line of the discoidal coulter blade; means for translating the discoidal coulter blade through the soil at a depth; means for rotationally driving a plurality of teeth configured proximal to and integral with the blade circumference; means for cutting the surface stubble and soil; means for rotationally and translationally driving a plurality of inserts sized to securably mount within a plurality of evenly spaced insert openings within the discoidal coulter blade, the insert openings configured in at least one circular pattern at a first radius from the blade hub, the first radius being less than the blade circumference.

BRIEF DESCRIPTION OF THE DRAWINGS

The invention will be more fully understood and further advantages will become apparent when reference is had to the following detailed description of the preferred embodiments of the invention and the accompanying drawing, in which:

FIGS. 13A-13E are diagrams of exemplary coulter blades with variable tooth number, tooth size, insert number and size, and gullet depth in accordance with embodiments of the present invention;

FIGS. 17A and 17B are diagrams of exemplary inserts in accordance with an embodiment of the present invention;

FIG. 21 is a flowchart for a method for altering surface stubble while simultaneously mulching, tilling and aerating the soil exemplary of an embodiment of the present invention;

FIGS. 29A-I are diagrams of exemplary inserts in accordance with an embodiment of the present invention, particularly showing a notch blade insert;

FIGS. 30A-I are diagrams of exemplary inserts in accordance with an embodiment of the present invention, particularly showing a razor blade insert;

FIGS. 31A-I are diagrams of exemplary inserts in accordance with an embodiment of the present invention, particularly showing a ripple blade insert;

FIGS. 32A-I are diagrams of exemplary inserts in accordance with an embodiment of the present invention, particularly showing a Sameri blade insert;

FIGS. 33A-I are diagrams of exemplary inserts in accordance with an embodiment of the present invention, particularly showing a straight blade insert;

FIGS. 34A-I are diagrams of exemplary inserts in accordance with an embodiment of the present invention, particularly showing a turbo blade insert;

FIGS. 35A-I are diagrams of exemplary inserts in accordance with an embodiment of the present invention, particularly showing a vortec blade insert;

FIGS. 36A-I are diagrams of exemplary inserts in accordance with an embodiment of the present invention, particularly showing a wavy blade insert;

FIGS. 37A-F are diagrams of exemplary fillets, True V Extended Fillet and True V Mate Taper, in accordance with an embodiment of the present invention;

DESCRIPTION OF THE PREFERRED EMBODIMENTS

Figure 1:
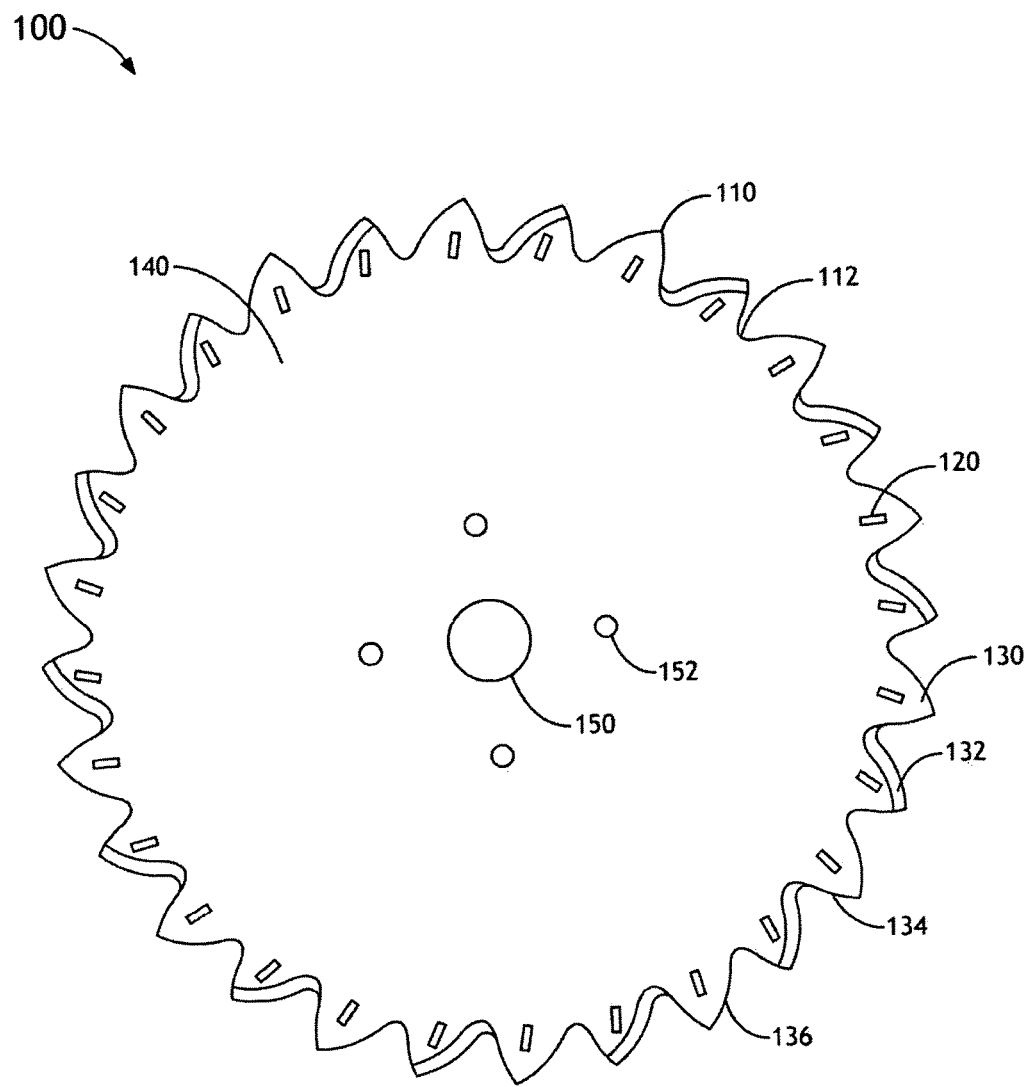
FIG. 1 is a diagram of a coulter blade with sized inserts exemplary of an embodiment of the present invention.

Reference will now be made in detail to the presently preferred embodiments of the invention, examples of which are illustrated in the accompanying drawings. The subject Variable Tooth Coulter Blade With Sized Inserts shall be referred to throughout as the STI Series blade, or the subject coulter blade, generally.

The following description presents certain specific embodiments of the present invention. However, the present invention may be embodied in a multitude of different ways as defined and covered by the claims. In this description, reference is made to the drawings wherein like parts are designated with like numerals throughout.

One goal of the present invention may include a device capable of cutting the soil with a minimum required Downward Pressure (DP). DP on tillage equipment may be directly proportional to force required to pull the tillage equipment through the field. A reduction in DP equals a corresponding reduction in force and thus, reduced fuel used to pull the equipment.

An additional goal of the present invention may include a coulter blade with a plurality of sharpened teeth, the teeth shaped to efficiently cut a substantial portion of stubble. The teeth may be of uniform shape or variable with angular position around the circumference of the blade.

An additional goal of embodiments of the present invention may be to mulch, till and aerate the soil with which the inserts of the blade may interact. Such mulching, tillage and aeration may prove beneficial to annual root growth as well as long term health of the soil.

An additional goal of the embodiments is to uniquely provide a blade that functions in wet and dry soil, while providing a large degree of blade angle rotation.

Another goal of the embodiments of the present invention is to provide a coulter blade with sized inserts that is driven by tooth and insert geometry. Geometrically, the unique structural combination of the tooth has been surprisingly and unexpectedly found to operate to not only provide optimal soil preparation, but to drive the coulter blade.

Applications

The subject STI series blade is contemplated having various configurations for optimizing soil engagement, including single side, opposing side, coned, curved, waffle, strait, notched tooth, ripple, turbo, vortex, or multiple blade configurations. Other configurations contemplated include rotating knife, Multiple sided, geometrical or tillage apparatus or blade high pressure tube injection coulter system, and inserted covering finger, multiple tooth at multiple angles, multiple inserts at multiple angles and designs including serrated teeth at multiple angles and configurations. Blades with multiple attachments or devices as to insert, inject or placement are also contemplated.

Further contemplated by the subject STI series blade are applications in seeding; planters, seeders, or seeding systems using ground engagement or attached multiple use placement systems SDS [Seed Delivery Systems]-FDS [Fertilizer Delivery Systems]-MDS [Manure Delivery Systems]-LDS [Insecticide Delivery Systems]-BDS [Biological Delivery Systems]-CEDS [Carbon Exhaust Delivery Systems]-TRPDS [Transplant Delivery Systems]-ETRDS [Electronic Delivery systems].

Other contemplated applications of the subject STI series blade or coulter blade with inserts include use with: 1. tillage tools and soil excavation; vertical tillage, disk, fertilizer eq, manure eq, waste eq, mulching eq, plow, sub soil compaction eq, step till, road construction, excavation eq, tiling, multiple cable laying machine, lawn aeration and fertilization, roto-tillers, insecticide or multiple element placement or injection from gas—solutions—granular and utilizing moist granulated soil sealing capabilities [example—NH3 or carbon exhaust]; 2. plant and cellulose processing, cutting and harvesting; silage choppers, corn heads, grain heads, pea harvesting heads, hay or cellulose harvesting, hay and cellulose processing [for example, tub grinders-bio-mulching eq, carbon shredding eq, aluminum shredding or cutting eq, poly shredding or cutting eq, low density elements processing], sickle sections, sugar cane harvesting eq, row crop header, disk bine, detasselers, food and carbon product processing; 3. Cutting—shredding; mowers, shredders, brush cutters, tree trimming, stump grinding, woody and plastic processing, polymer processing; and 4. hand tools and power driven devices; machetes, axes, hatchets, knifes, kitchen utensils, meat grinders and processors, bone grinders, surgical instruments, and military defense.

Blade Size and Shape

An exemplary embodiment of the present chosen for illustrative purposes may include a coulter blade of circular shape with a plurality of teeth configured to interact with chaff on the surface of the soil as well as the soil itself. This exemplary embodiment employs at least one circular row of inserts oriented normal to the surface of the blade and able to interact with the soil as the blade traverses the soil.

Blade Rotation as to the Linear Distance Traveled. The subject STI Series blade rotates up to 96% of linear distance traveled at hub depth or shallow depth. The subject STI series blade utilizes blade rotation as to the Linear Distance Traveled, Cutting, Self Sharpening, Soil Granulation and least amount of Contact in The least amount of time. STI series blade rotates 85-96% of linear distance traveled hub deep. A good number of heretofore disclosed and utilized blades slip up to 50% of the travel distance at hub depth and most current blades slip 20-30% of linear distance traveled. On the other hand, the subject STI series blade substantially avoids slippage and as a result, yields optimal soil treatment and crop growth while saving time and lessening carbon footprint. Typical heretofore and utilized blades require substantial surface contact to rotate, for example—on each side of blade ~200 inches of contact to turn; conversely, the subject STI series blade only needs ~40 inches of contact to turn.

Forward Motion

When objects are pushed or moved forward, at certain geometrical angles, engagement angles engaged downward or certain lateral downward movement. The object utilizes forward rotation, forward forces, forward energy and forward angles to engage, thereby lessening energy, force required [down pressure] and lessening soil or product compaction. For example, a circular object engaged in soil generally pinches and/or rolls upward and out [i.e. a wheel], which requires more down pressure and energy to maintain depth control. By utilizing certain geometrical objects at certain geometrical angles, objects may utilize soil or product density as to pull, anchor, leverage or engage.

Objects: Fillet or Gullet, Insert, Backside of tooth of the subject STI series blade—without being bound by theory, rotation during forward motion maximizes friction and concentrated friction. Forward rotation at certain geometrical angles with certain geometrical objects flow product outward, lessening soil or product area and volume. Forward rotation at a 3:30-6:00 angle is a push force of which reverses to a pull force at or after the 6:00 angle [insert ratchet point] is rotated forward and upward toward the hub center point in forward motion and soil or product exit point in forward motion. Thereby utilizing the pull and lift force to lessen the push force by maximizing the object geometrical designs and at certain geometrical angles.

Forward tooth rotation of the subject coulter blade with an upward point, upward multiple angles or upward sabers, utilize concentrated friction and force in forward rotation and forward motion, verses downward angles, chopping actions or of common blade geometry. Soil compaction is lessened in forward rotation of the subject blade by the previous tooth removing soil compaction of the present tooth, in a crossing and or forward lifting pattern.

The subject STI series blade is driven via forward motion by tooth geometry with or without inserts. Geometrically, in combination the backside of the tooth [preferably, a Vertical Blunt edge], tooth fillet or gullet, opposing or single tooth bevel pattern, tooth bevel angle, and inserts structurally result in a blade that exhibits the least amount of contact in the least amount of time theory. This means that the subject blade predominately only has soil contact on the outer circumference of 1-2.5", for example, thereby lessening Friction by Soil contact while other blades have a much greater soil contact.

Structurally, in preferred embodiments, the backside of the tooth has a vertical blunt edge, while between each tooth there is a fillet or gullet, and an opposing tooth bevel pattern is provided. Combined, each of these structural features operate in concert to optimally drive the coulter blade via forward driving force. Alternating soil contact pressure utilizing a forward driving force drives the blade forward while also keeping the blade in a straight linear motion, as opposed to a side driven motion which causes massive contact and friction.

Conversely, current coulter blades use the pinch/wedge, notch or down pressure theory, typically moving forward by way of side driven motion as the soil presses onto large surface area sides of each blade, cause compaction of the soil. As a result, the soil does not aerate, maintain moisture or drain properly and therefore it leads to crop failure. On the other hand, the subject invention provides a coulter blade with or without sized inserts that uniquely function to lessen sidewall compaction and pressure, thereby lessening blade friction and allowing easier rotation. At the same time, the subject blade results in a granulation of the soil which leads to optimal aeration, drainage and capillary moisture action for optimal crop yields. Least amount of contact in the least amount of time results with use of the subject coulter blade as the blade predominately only has soil contact on the outer circumference, lessening friction by soil contact.

The subject STI series blade uses a concentrated saber tooth shaped—beveled or curved bevel, using friction and force in forward motion, resulting in actual consistent rotation. Resulting in least amount of contact—least amount of time in line with soil treatment theory. The subject STI series blade can be variable Geometrical Angled and Configured with serrations for forward motion, or not.

Self Sharpening

By utilizing Soil or product flow in certain Geometrical Angles and Flow [the fillet and tooth design] the subject STI series blade may increase or decrease wear, as soil or product flow is directed so as to maintain tooth geometry in one or more designated areas. Utilizing the Friction Flow Theory, Tooth integrity and Tooth profile throughout the wear cycle of the blade may be maintained. This can be achieved a number of ways. Firstly, by changing the fillet (size, angle, position and geometrical shape). Or by adjusting a concentrated soil flow across the tooth bevel side and controlled concentrated flow through the fillet at the back edge of the tooth profile, thereby causing normal wear forces to maintain tooth geometry and a sharpening action.

Soil Granulation, Subsoil Fracture, Sidewall Fracture

Soil Granulation, Subsoil Fracture, Sidewall Fracture of soil is achieved through use of the subject STI series blade with or without inserts. Tooth geometry of the subject blade in conjunction with insert angle, insert geometrical design, insert size, insert plurality and insert placement on blade, results in piercing of the soil at a geometrical angle in forward motion utilizing the least amount of contact and least amount of time.

By piercing the soil at certain insert angles and certain hub to insert angle ratios in forward motion, the insert of the subject blade pierces the soil and rotates generally to a 6:00 position, lifting soil at a geometrical angle towards the hub center point, thereby causing subsoil fracturing at the base of the tooth, sidewall fracturing and a soil granulating effect. This is due to lessening soil compaction in forward motion, which is the cause of Soil clodding.

Sealing: By Granulating and Fracturing Soil through use of the subject coulter blade/STI series blade versus clodding (as with typical blades), this allows Products to be placed under and in the existing soil profile fractures in a horizontal position, thereby the existing soil seals and holds or stores Product. Conversely, in a compact, sealed and vertical position products may not be able to proliferate into or through the Soil Profile. This soil action makes the subject STI series both Environmental Protection Act (EPA) and Department of Natural Resources (DNR) friendly.

Cutting, Sizing, Slicing, Shredding, Mowing and Processing

The subject coulter blade with or without inserts, in one embodiment, uses a concentrated saber tooth shape and a beveled or cupped bevel tooth. Using friction and force in forward motion and actual consistent rotation the least amount of contact—least amount of time results. Variable geometrical angled teeth and configured serrations or multiple tooth fillets or gullets may be implemented according to angle or angles in forward motion based on the crop intended for planting/treatment or the soil type. Tooth shape and insert size, shape and angled arrangement helps alleviate hair pinning during operation. Attributes of the tooth allows a slicing motion as well as a chopping motion. Cupped or curved tooth lessens down pressure requirements and allows for increased and a more aggressive cutting action.

The coulter blade with or without sized inserts have an increased or longer linear tooth area versus the blade circumference area, thereby allowing up to 50% more shearing and cutting action per revolution of the blade—versus—linear distance travelled. By increasing shearing and cutting action per revolution, a smaller diameter blade may be used to increase tip speed and maintain depth with less down pressure requirements, thereby lessening equipment maintenance by stress and a decreased carbon foot print.

Single or altering beveled tooth patterns can be used by the coulter blade with or without sized inserts for a variation of soil types, multiple application and cutting conditions or blade applications. All coulter blades with sized inserts can be configured and reconfigured with replaceable teeth and inserts. Additionally, the coulter blade with sized inserts may be used in a shaft driven application [for example—mowing, hay cutting or processing]. The coulter blades with sized inserts are typically run at a higher rotational speed than linear travel in a mowing application; thus the tooth may be pitched in an upward angle to allow for lift of products to be mowed.

The subject coulter blade with or without sized inserts preferably utilizes a curved tooth or fillet that lessens soil contact and friction by utilizing an undercut curvature along the length of each individual tooth [undercut curved or fillet, along bevel area], while maintaining a sharper cutting edge. This construction allows increased cutting, less down pressure requirements and a self sharpening action.

Tooth Seriation or Tooth Fillets

In an exemplary embodiment of the subject coulter blade with or without sized inserts, a seriated tooth is geometrically aligned with respect to the insert angle, utilizing a fillet, curved or non-curved, flat, wedge or other geometrical protrusions, against the beveled side of the tooth with a plurality of angles and sizes. With or without inserts or single and or double sided tooth configurations at multiple geometrical angles. Increased cutting, lower down pressure requirements and less surface tension on cutting edge results; designed granulation of the soil [soil particle size] or amount of soil granulation can be controlled. Additionally, self sharpening can be effectuated by controlled, concentrated soil flow. Lessoned soil sidewall pressure [compaction] and subsoil compaction are also enhanced by way of the tooth seriation or tooth fillets. Such constructs of the subject coulter blade result in uses for various soils, products, processing and other applications. Insert seriation or fillet at multiple configurations and geometrical angles of the subject coulter blade maximize soil flow, particle size and granulation.

Inserts

The subject coulter blade may utilize or not utilize Inserts according to the applications. Inserts may be of multiple geometrical configurations, sizes, length, depth, width, number of rows and angles [as to the hub or tooth angle, according to embodiments associated with outer and inner or multiple rows. Inserts may be applied, glued, fused, sweated, heat treated, coated or welded, inset [glued, fused, sweated, heat treated, coated, or welded], multiple stamped protrusions, snapped on or twist locked, pressure fitted or slide locked. Inserts may be utilized on a single side, double side, offset from side to side or multiple geometrical shapes from side to side according to application. Inserts may be used on the subject STI series blades as well as on present and future commercial production blades. The inserts may be comprised of a number of suitable materials, including but not limited to, Hardox, Boron, Tool Steel, Cast, Carbides, Glass, Polymers and multiple metal alloys/compositions.

STI Series Fillet or Gullet

The Fillet may cut material previously cut or uncut by the tooth and releases material in an upward forward motion. The Fillet is a final cutting assurance device. The Fillet may be used in a shallow tooth application and Shallow depth applications [Ex STIP Blade series, Seeding, Planting, Shallow tillage or Tillage]. Final cut or fine cut [Ex Wheat, Green Peas, etc.] applications also contemplate use of the fillet or gullet. Moreover, in high speed shaft driven applications, the fillet increases cutting processes in a reverse rotation. During rotation, the circumference position or positions of the fillet add area as to the soil lodging effect against the circular or multiple geometrical designs and or multiple angles, thereby generating a rotational force.

Granulation: The Fillet allows soil placement with in the fillet area upon entry, and releases stored or placed soil in an upward exiting motion, thereby causing and increasing a soil granulating effect or granulated soil particle size. Granulated soil may be increased or decreased according to fillet geometrical design, plurality and size.

Lessons Soil, Subsoil and Sidewall Compaction: The fillet lessons soil, subsoil and sidewall compaction by allowing soil particle placement in the fillet area less force is exerted on the soil profile, lessening subsoil and sidewall compaction and soil smearing. Displacement of soil from the leading edge upon tooth entry and blade rotation lessons soil area or volume, thereby lessening applied soil pressure threw continued flow of soil from the cutting edge away from the blade and in a wedge flow, V flow or upward motion.

Lessons Down Pressure Requirements: By allowing Soil particle placement in the fillet area, less force is exerted on the soil profile. Displacement of soil from the leading edge upon tooth entry and blade rotation, lessons soil area or volume. Applied soil pressure is thereby lessened through continued flow of soil from the cutting edge away from the blade and in a wedged flow or V flow, outward flow and upward motion; thereby down pressure requirements are lessened.

Tooth Profile Maintenance

By utilizing the friction flow effect, tooth integrity and tooth profile throughout the wear cycle of the blade may be maintained by changing the fillet size, angle, position and geometrical shape. By adjusting soil flow across the tooth profile and controlled concentrated flow through the fillet at the back edge of the tooth profile, normal wear forces operate to maintain tooth geometry and create a sharpening action.

The Insert and Tooth Geometry

As in Soil Granulation-Subsoil Fracture Sidewall Fracture. The tooth geometry [sabre or multiple sabre angles or lengths or geometrical designs, bevel angles, widths or lengths, curved or fillet or gullet bevels, multiple geometrical fillet or gullet designs on backside of tooth, seriation, multiple geometrical designs of fillets or gullets against tooth bevel in forward motion, multiple depths of tooth backside, plurality of teeth] in conjunction with multiple insert angles, multiple insert geometrical designs, insert sizes, widths, lengths, insert plurality, and insert placements on blade, pierce the soil at a geometrical angle in forward motion utilizing the least amount of contact and least amount of time and create a soil shattering and soil lifting effect at multiple angles.

By wedge flow, V flow, the subject coulter blade effectively forces soil away from the front of the blade and uses insert piercing action. This results in soil prefractioning at 3:30-5:30 in clock position in soil or certain multiple angles in forward motion and certain multiple hub to tooth angles, multiple fillet or gullet geometrical designs, insert angles and ratios in forward motion. The insert prefractures the soil; then rotates forward and downward to a rotating 6:00 position, at which time the soil pulls or lifts in a forward, upward geometrical angle towards the hub center point. This causes subsoil fracturing at the base or tip of the tooth, sidewall fracturing and soil lifting from 0.5" to desired application and soil granulation. Soil compaction is lessened in forward motion by geometrical angles, positions and designs, least amount of contact and least amount of time. This decreases undesired soil clodding, soil ribbons and blade roll [i.e. soil being attached to the blade by soil compaction or force whereby, as the blade roles forward, there is a massive soil lifting effect, resulting in a void, hole or debit lift in the soil profile which is not desired].

Sealing: By granulating and fracturing soil—vs—clodding, the subject coulter blade allows products [for example, NH3, manure, liquid nitrogen, phosphates, volatile products or biological products] to be placed in and under the existing soil profile fractures, in or at horizontal positions without destroying preexisting soil structure, passages or fractures. As a result, the existing soil absorbs, seals, holds and stores products. This avoids creation of subsoil and vertical sidewall compaction and a sealed environment, wherein products may not be able to proliferate into or through the soil profile and volatilize into the atmosphere or runoff into undesirable areas. This concept makes the subject STI series blade EPA and DNR friendly. Granulated soil increases fertilizer and or product efficiency, increases soil to seed contact for better seed germination, increases application options of no-till, minimum till, cover crop inter-seeding and reduces moisture losses.

Least Amount of Contact—Least Amount of Time

The subject STI series blade predominately only has soil contact on the outer circumference of the blade, which includes the tooth geometry and or inserts with or without. This lessens friction and time of friction by soil contact or amount. By limiting blade pinch [soil contact and side force or side forces of the blade], surface contact area is lessened substantially. Alternating beveled teeth cause a wedge flow, V flow, or outward flow of soil or soil displacement in the front edge of the blade, thereby lessening soil area, amount of soil contact, amount of compacted soils and amount of time. Soil flow from the tooth to the insert in a wedge motion, relieves contact against blade side surface or side surfaces and duration of soil/blade contact.

Seeding Blades: STIR-STIP-Multiple Geometrical Tooth Configurations

Seeding Blades: Maximize Blade Rotation by means of fillet and tooth design and lessen sidewall blow out and sidewall smearing and blade roll, preventing soil push and plug of seeding devices. Seeding blades configured in accordance with the present invention can cut light or heavy residue, wet or dry residue [GMO materials], multiple massive root systems green or dry, cover crops green or dry and double cropping. They can allow multiple seed types, multiple seed placements at multiple depths, multiple applications and multiple geometrical configurations at slow or high speed in multiple soils and multiple soil challenging conditions, eliminating the need for extra tillage passes, forward coulters [i.e. no till coulters]. multiple geometrical configurations for present and future planting, trans planting or seeding units are contemplated [for example, planters, drills, air seeders, inline planting, vertical planting designs, trans planters and the like]. Seeding Blades are also contemplated by the subject coulter blade invention to maximize a moist granulated soil-seed covering effect for early germination. Fracturing sidewalls lessen subsoil compaction and soil profile preservation, maximize early and late root development, nutrient uptake and moisture management through soil granulation and soil sealing, eliminating the need for spike, finger or aftermarket closing devices. The variable tooth coulter blade described herein may also be configured as a seeding blade.

Inline Seeding and Inline Product Placement

The STI series uses a concentrated Sabre Tooth shape in an exemplary embodiment. Beveled or cupped bevel tooth configurations may also be utilized. Using friction and force in forward motion, actual consistent rotation, the least amount of contact and least amount of contact time results. Variable geometrical angled teeth and configured seriation or multiple tooth fillets or gullets according to angle or angles in forward motion may be used. The attributes of the tooth allow a slicing motion as well as a chopping motion. The cupped or curved tooth lessens down pressure requirements and allows for increased and more aggressive cutting action. The STI series have an increased or longer tooth area—vs—the blade circumference area, thereby allowing up to 50% more shearing and cutting action per revolution of the blade—vs—linear distance travelled. The subject coulter blade maximizes blade rotation via fillet and tooth design and lessens sidewall blow out and sidewall smearing and blade roll, preventing soil push and plug of seeding devices. The variable tooth coulters described herein can be used to cut light or heavy residue, wet or dry residue [GMO materials], multiple massive root systems green or dry, cover crops green or dry and double cropping. They can allow multiple seed types, multiple seed placements, at multiple depths, multiple applications and multiple geometrical configurations at slow or high speed in multiple soils and multiple soil challenging conditions, thereby eliminating the need for extra tillage passes, forward coulters [no-till coulters]. Multiple geometrical configurations for present and future planting are contemplated, including trans planting or seeding units. [Examples include planters, drills, air seeders, inline planting, vertical planting designs, Trans planters and the like].

The subject STI series blade allows for seed placement directly behind the blade, via seed tube devices or apparatus, along with conventional closing devices or geometrical designed closing devices. The STI series maximize or enhance inline seeding placement and product placement by maximizing soil granulation, decreasing sidewall compaction and sidewall fracturing, moisture retention, decreasing subsoil compaction, enhancing furrow forming at low and high speeds. Maximizing moisture and granulating moist soil on or around seeds, enhances seed germination. The STI series blade allows product storage, sealing, and enhanced proliferation through the soil profile.

Single or bidirectional bevel tooth and fillet or gullet flows soil upon entry in a wedge flow, V-flow, outward flow away from the blade, thereby lessening soil area, soil contact, compacted soil contact and subsoil compaction in forward motion. The inserts pierce the soil at a geometrical angle in forward motion of the coulter blade; this results in the least amount of contact—least amount of time and decreased friction. By soil lifting and fracturing the subsoil and soil sidewalls, the seed or product zone is composed of fine or moist granulated soil, allowing enhanced seed germination and placement or product placement and/or the application of conventional or geometrically designed closing devices.

Soil prefracture: the variable tooth concave coulter blade's teeth and/or inserts, granulate and prefracture, lessening normal slabbing and normal clodding caused by normal soil compaction in forward motion, normal down pressure and normal lateral movement. As the soil exits off the concave blade, the inserts further lift and granulate the ribbon affect. Whereas, on the opposite lateral side, the soil is normally compacted by down pressure and lateral forces, the inserts are used to pierce the soil in forward motion, fracture soil, lift soil and granulate soil, thereby lessening undesired compaction left in the soil.

Referring to FIG. 1, a diagram of a coulter blade with sized inserts exemplary of an embodiment of the present invention is shown. A circular coulter blade 140 exemplary of the present invention may include a plurality of teeth 110 each tooth 110 having a tooth cutting edge 136 and tooth back 134. Between each tooth 110, a gullet 112 may retain specific qualities for tooth effectiveness. In embodiments, each tooth 110 is sharpened on opposite and alternate lateral sides 132, 130 to effectively eliminate lateral sidewall pressure as the circular coulter blade cuts the soil. In embodiments, the circular coulter blade 140 may be configured with a plurality of inserts 120. Preferably, the subject coulter blade with sized inserts uses a concentrated saber tooth shape as shown generally at 130. A beveled or cupped bevel tooth construct, as shown at 132, may be provided for cutting, sizing, slicing, shredding, mowing and processing soil and stubble.

In one embodiment, the circular coulter blade 140 is detachably mountable to a tillage machine capable of mounting and operating many coulter blades 140. Coulter blade 140 may be detachably mountable to the machine via blade hub 150 and drive holes 152. It is contemplated herein; a bearing or other well-known rotatable device may allow for free rotation of the coulter blade 140.

Rotation of the blade is preferably from right to left with the sabre shape of the blade cutting edge 136 impacting and cutting the stubble on the surface of the soil. As inserts 120 enter the soil, the rotational action of the inserts 120 may fracture and bring to the surface an amount of soil with which the insert 120 may interact. Additionally, soil proximal to the insert 120 may also be fractured and brought to the surface due to energy transferred from the insert 120 to the adjacent soil.

Figure 2:
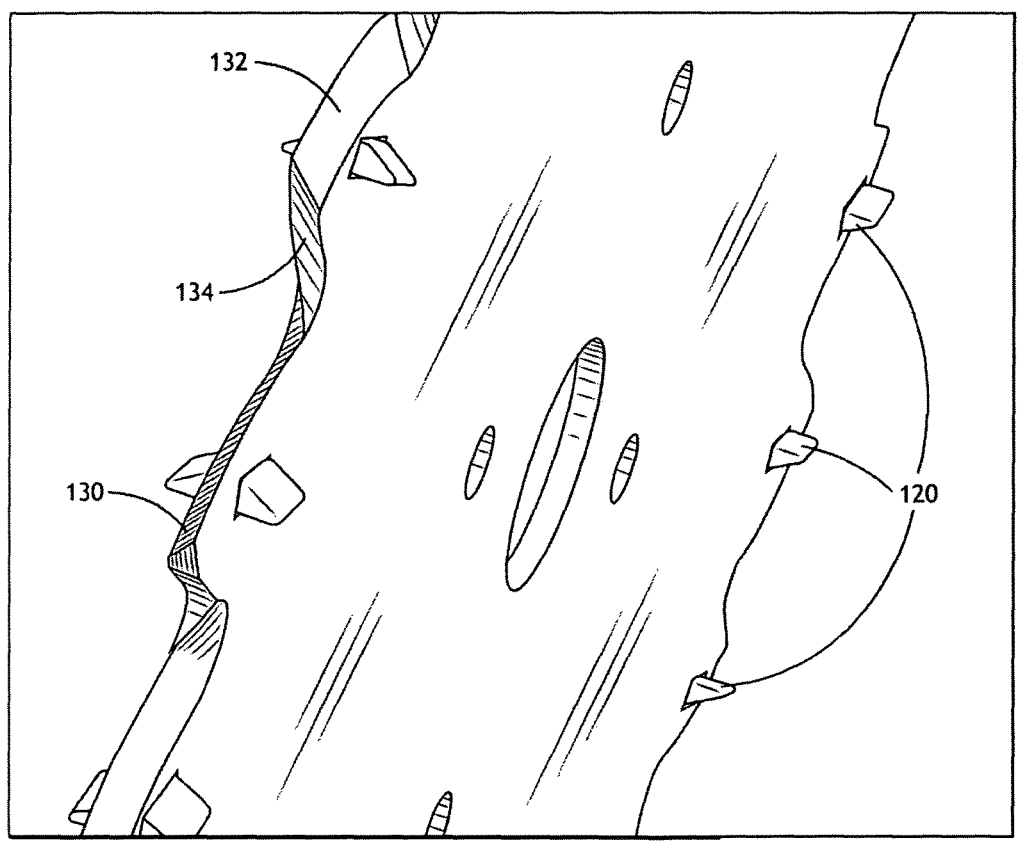
FIG. 2 is a detail diagram of a coulter blade with sized inserts exemplary of an embodiment of the present invention.

Referring to FIG. 2, a detail diagram of a coulter blade with sized inserts exemplary of an embodiment of the present invention is shown. Sized inserts 120 may be clearly shown extending laterally from the circular coulter blade. Teeth 110 sharpened on a first lateral side 132 are adjacent to teeth 110 sharpened on a second lateral side 130. Tooth back 134 may help drive rotation of the coulter blade 140 as it interacts with the soil.

Figure 3:
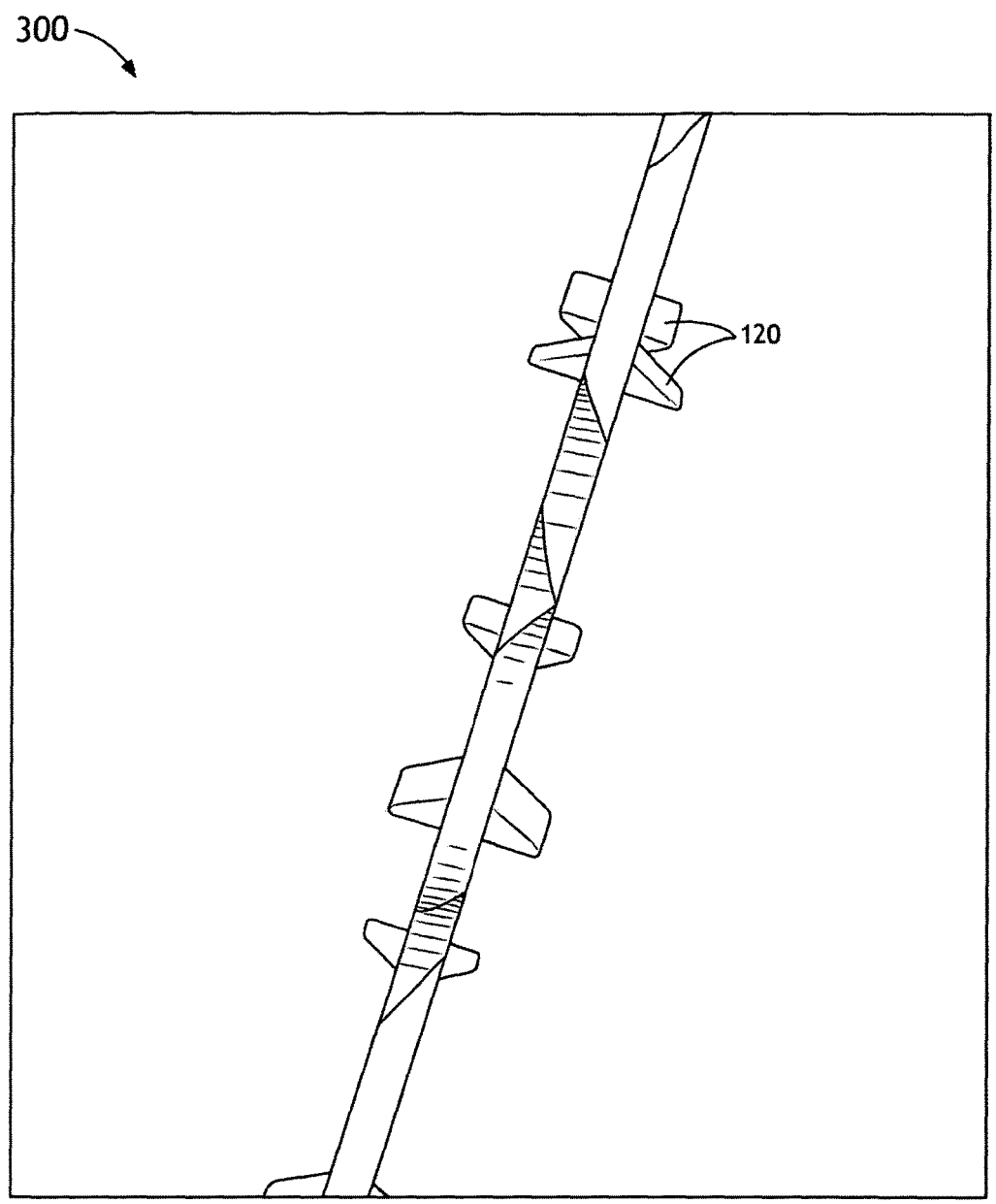
FIG. 3 is a detail side view diagram of a coulter blade with sized inserts exemplary of an embodiment of the present invention.

Referring to FIG. 3, a detail side view diagram of a coulter blade with sized inserts exemplary of an embodiment of the present invention is shown. Inserts 120 may extend laterally from the coulter blade 140. The shape of inserts 120 may depend upon the compaction and moisture level associated with the soil type of intended interaction. Shaped inserts 120 may be seen protruding from opposite sides of the coulter blade 140. Preferably, tapered inserts 120 of variable size may be incorporated to manipulate a desired amount of soil.

Within the scope of the present invention, coulter blade 140 may be constructed of a variety of material suitable for structural integrity while embedded in the earth providing earth aeration. In one embodiment, a coulter blade 140 of the present invention may be constructed of hardened steel such as that manufactured as "Boron".

Skilled artisans will recognize embodiments of the present invention may be manufactured from a variety of materials capable of abrasion resistance, long wear under stress, and able to be formed to the shapes required herein.

Variable sized inserts 120 placed proximal to the teeth 110 of the coulter blade 140 interact with the soil allowing the coulter blade 140 sidewall to remain nearly free from soil contact. As the coulter blade 140 rotates, each tooth 110 cuts into the soil and each insert 120 enters the soil at the desired angle. As the coulter blade 140 rotates, the insert 120 also rotates about the blade hub 150 and penetrates the soil. This insert 120 rotation and translation causes the soil with which the insert is in contact to become fractured and moved. As the blade hub 150 translates in a forward direction, the teeth and inserts 120 rotate about the hub causing the inserts 120 to lift soil to the surface. Depending on the depth of the coulter blade 140, the insert 120 rotational interaction with the soil may be increased (greater depth) or decreased (lesser depth).

An additional goal of the present invention may include leveling of the soil surface for optimal planting of a crop. In embodiments, the variable tooth coulter blade 140 may interact with the soil where tire tracks have compacted the soil over time. As the teeth 110 cut the stubble and soil, the inserts 120 interact with, aerate and loosen the compacted soil.

A further goal of the present invention may include aeration of the soil with or without removing large quantities of subsoil to the surface. For example, conventional blades may remove large clods or clumps of soil to the surface and may cause an unrecoverable moisture loss as well as undesirable large cavities below the surface. In addition, large clumps or clods of soil may remain unusable for over one growing season. Embodiments of the present invention may be configured to sufficiently aerate the soil with minimum void creation while leaving soil and root systems intact.

Embodiments of the present invention may enable tillage and aeration of the soil without removal of a previous root system. A previous root system may allow for organisms to breakdown and deposit the remnants usable for the next crop. Embodiments of the present invention may cut the root system without removing the root system from below the surface. This clean cut may allow for temperature movement, for water movement and increased aerobic flow to allow for organic organisms to thrive.

Tooth Size and Shape

Figure 4:
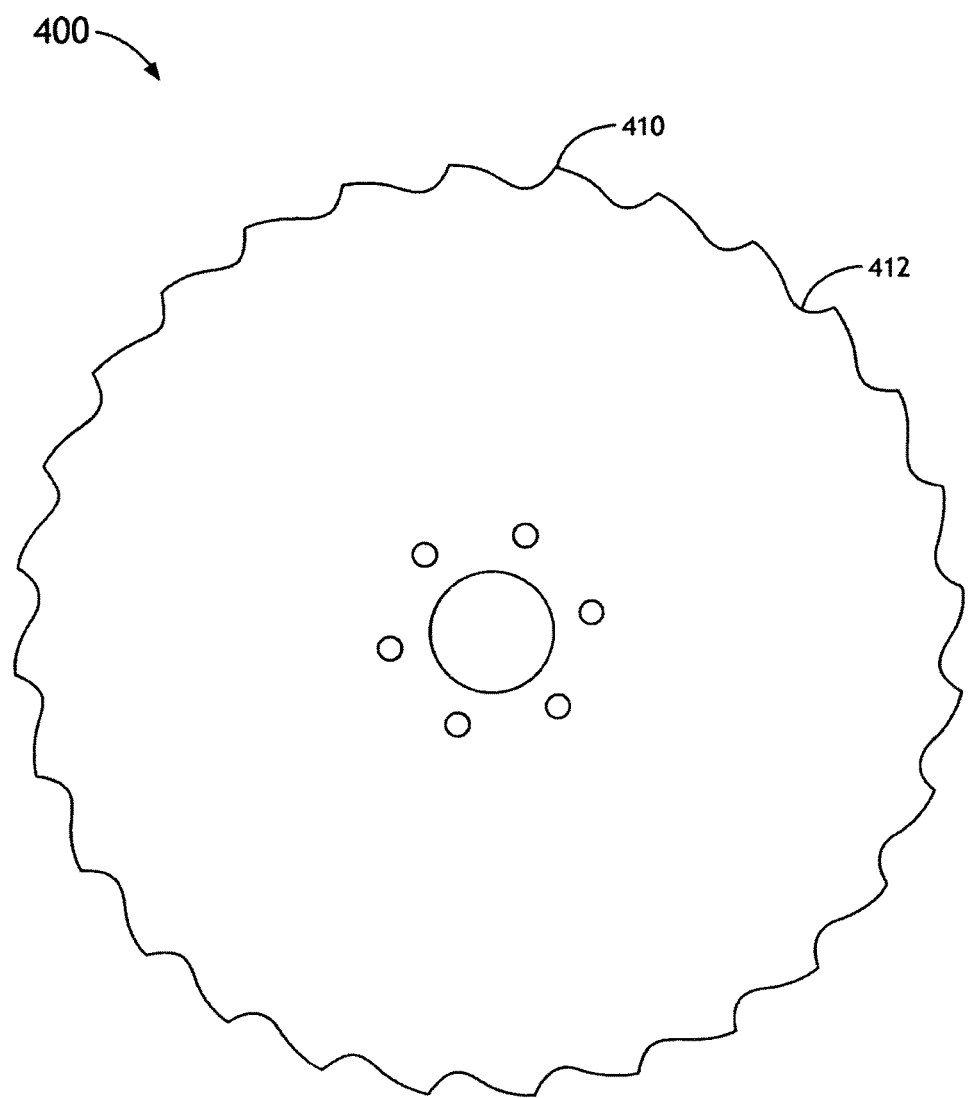
FIG. 4 is a diagram of a 28 tooth embodiment configured for rocky soil exemplary of an embodiment of the present invention.

Referring to FIG. 4, a diagram of a 28 tooth embodiment configured for rocky soil exemplary of an embodiment of the present invention is shown.

It is contemplated herein; the size and shape of each tooth may be altered for optimal performance for a particular type of soil. For example, in rocky soil, an operator may desire a shorter backside of tooth 410 enabling the teeth to withstand a rock impact whereas in sandy soil, an operator may prefer a longer backside on tooth 410 to enable greater stubble cutting while offering optimal soil aeration. The tooth 410 may enable a push of the rock to one side of the coulter blade 140 (see FIG. 1) resisting breakage due to rock impact.

It is further contemplated herein; tooth size and shape may be optimally configured for each of a plurality of soil types encountered by an operator. For example, a coulter blade 140 for rocky soil may possess a specific size and shape of tooth, a coulter blade 140 for non-rocky soil will possess a variant of the size and shape of tooth. While a coulter blade 140 for peat type soil may be optimally sized for penetration, a tooth for red clay or gumbo may be sized differently. Similarly, a coulter blade 140 designed for wet or dry soil may be optimally sized for proper aeration of the specific type of soil.

Figure 5:
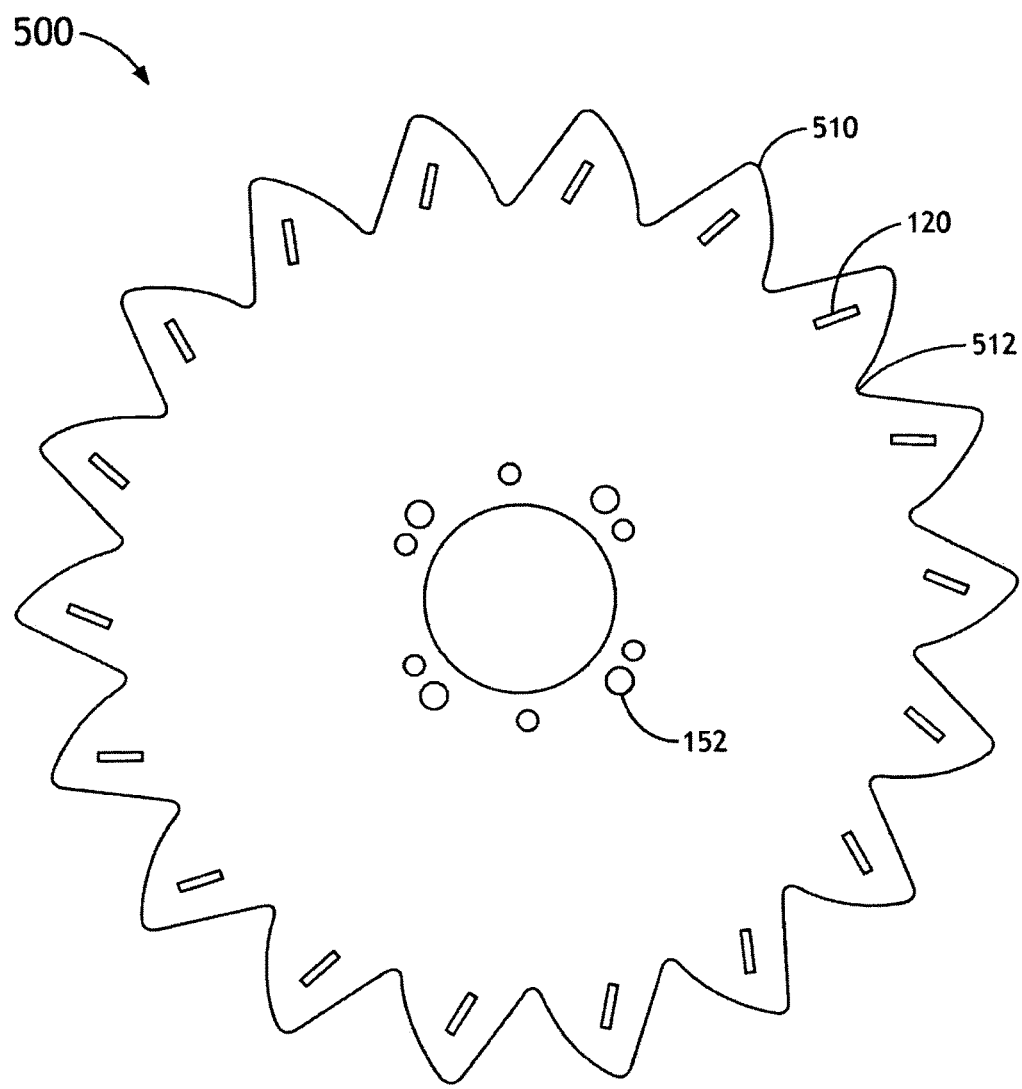
FIG. 5 is a diagram of an exemplary coulter showing 18 long teeth and an insert a variable angle exemplary of an embodiment of the present invention.

Referring to FIG. 5, a diagram of an exemplary coulter showing 18 long teeth and an insert a variable angle exemplary of an embodiment of the present invention is shown. An 18 tooth 510 design with inserts 120 may enable specific application in soft soil types. Tooth gullet 512 may be slightly rounded to continue a cut began by the cutting edge 136.

Figure 22:
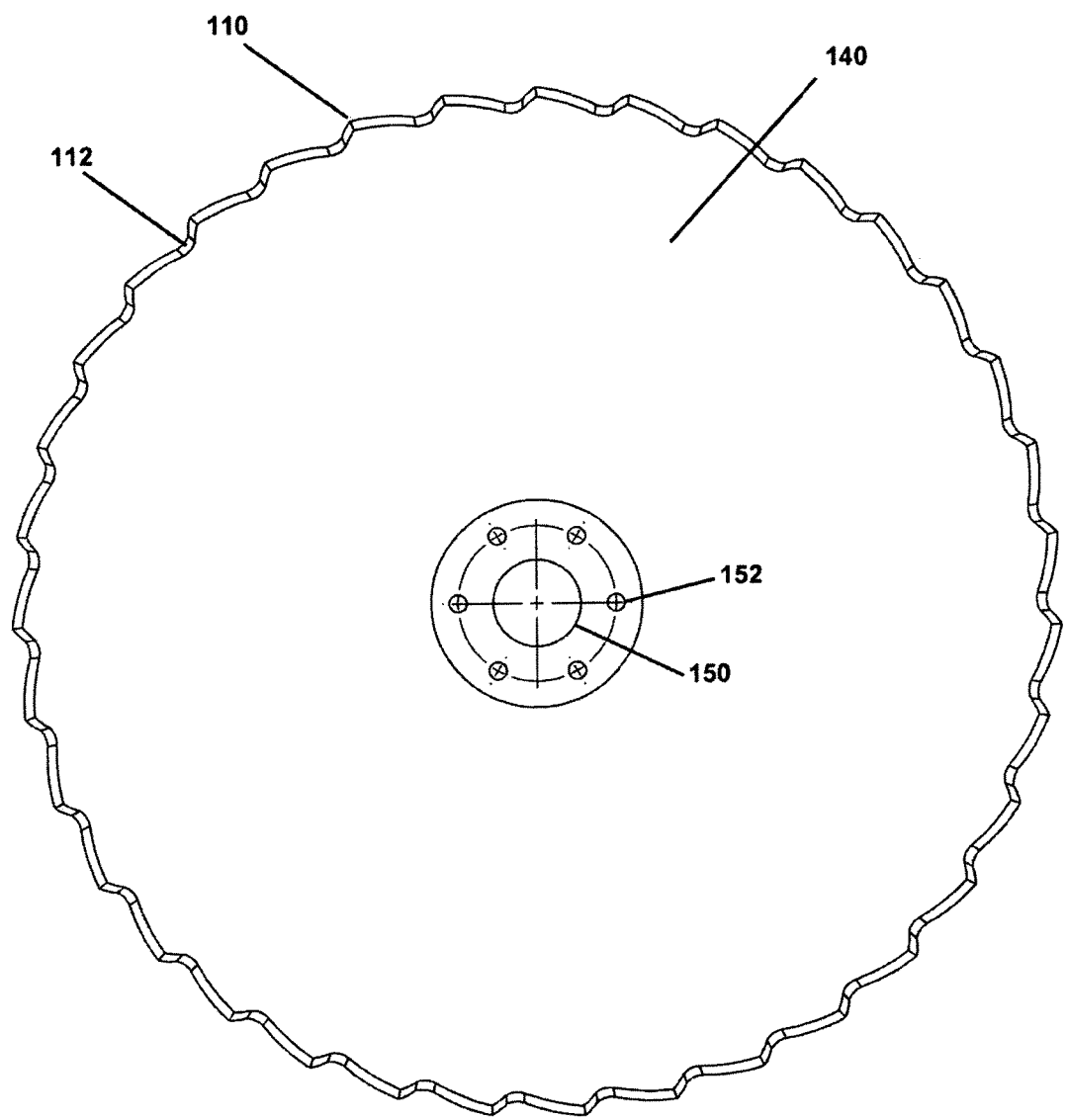
FIG. 22 is a detail diagram of exemplary insert location and size in accordance with an embodiment of the present invention.
Figure 23:
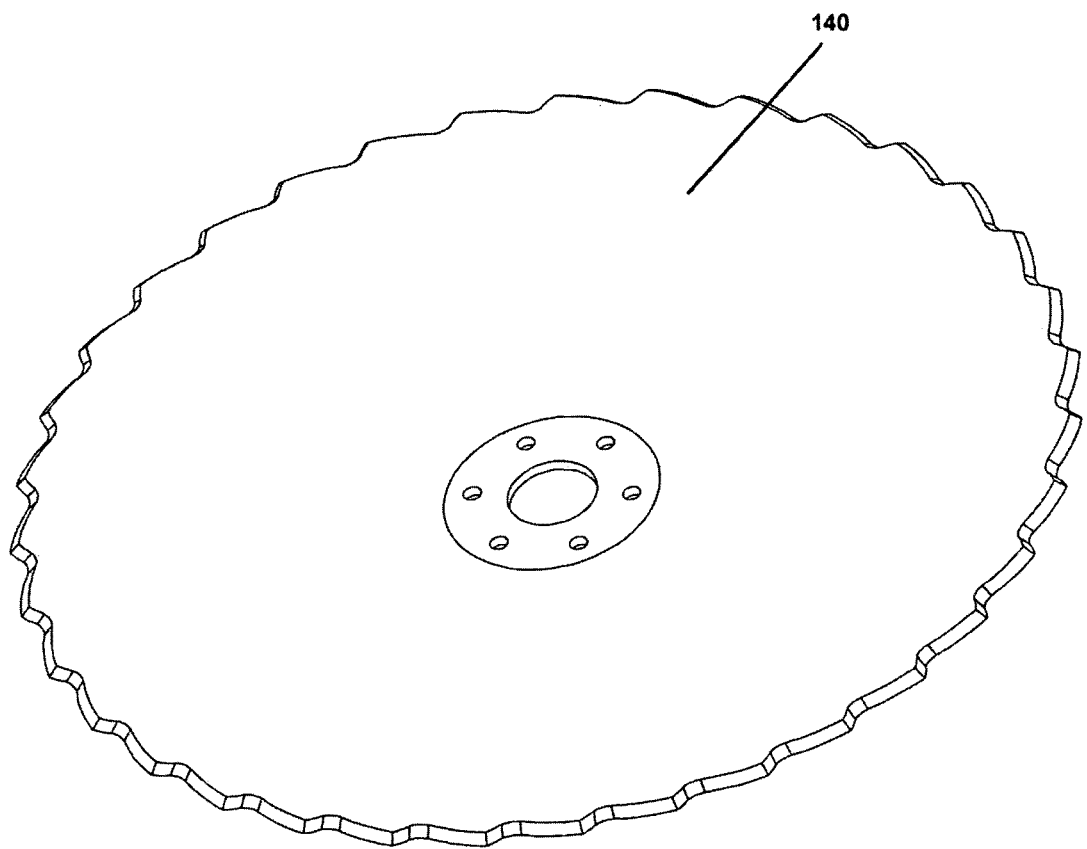
FIG. 23 is a detail diagram of exemplary insert location and size in accordance with an embodiment of the present invention.
Figure 24:
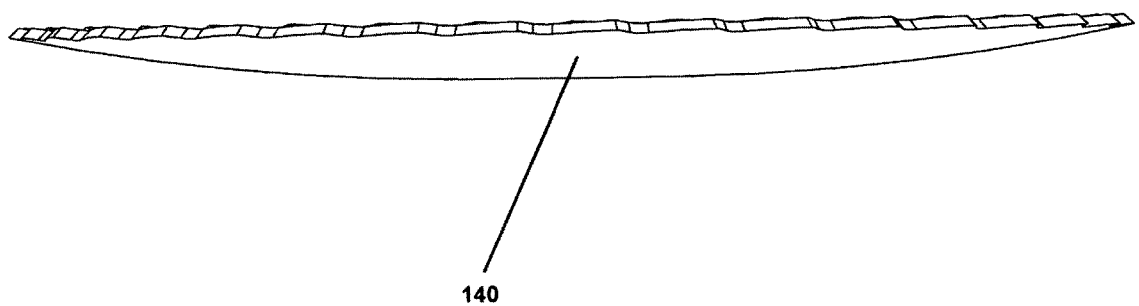
FIG. 24 is a detail diagram of exemplary insert location and size in accordance with an embodiment of the present invention.
Figure 25:
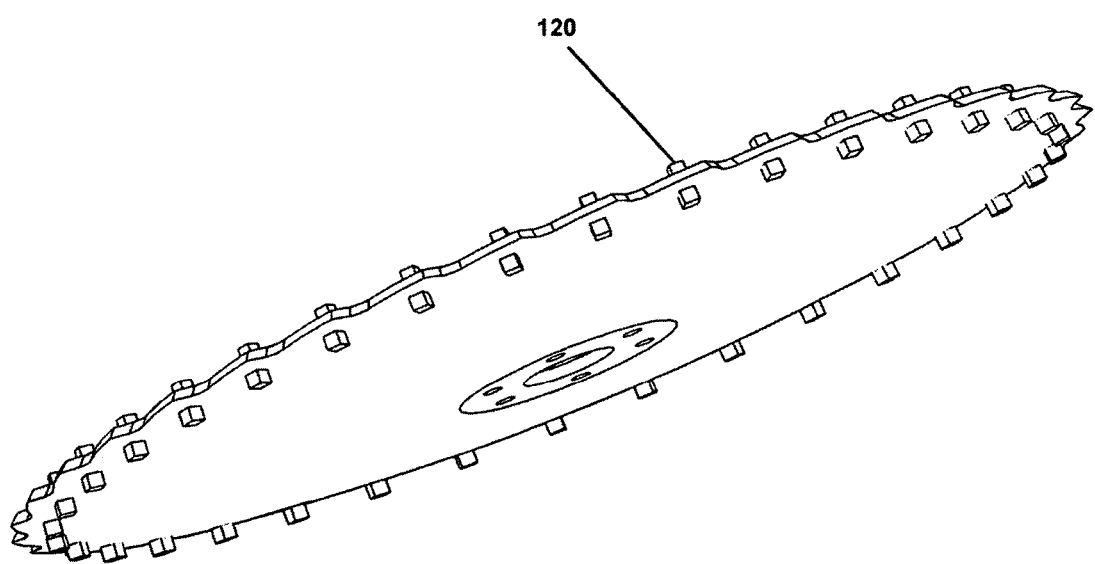
FIG. 25 is a detail diagram of exemplary insert location and size in accordance with an embodiment of the present invention.
Figure 26:
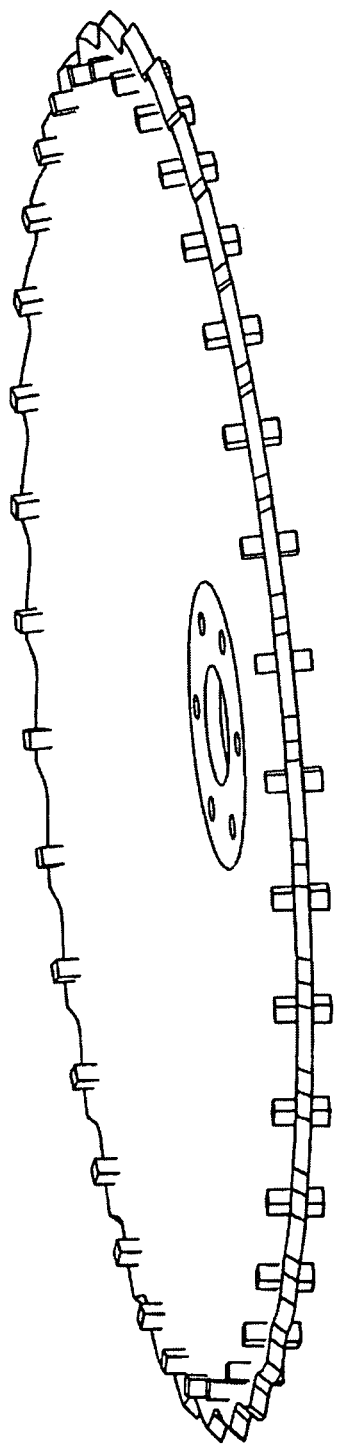
FIG. 26 is a detail diagram of exemplary insert location and size in accordance with an embodiment of the present invention.
Figure 27:
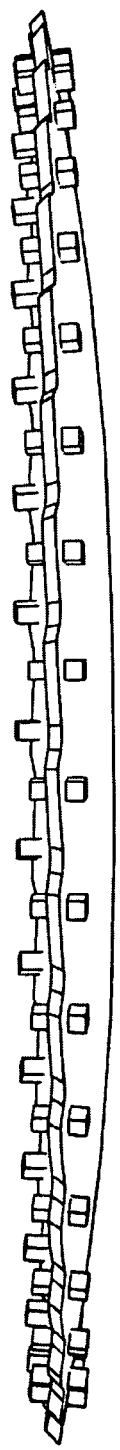
FIG. 27 is a detail diagram of exemplary insert location and size in accordance with an embodiment of the present invention.

Referring to FIG. 22, drive openings 152 may enable a plurality of applications including detachably mounting to an existing implement. For example, one embodiment of the present invention may replace a pair of disc elements operating on a planter implement to open a planting trench. Embodiments herein may be specifically sized to replace elements currently used in operation.

Tooth Number

Referring to FIG. 1, the number of teeth 110 is sufficient to ensure a cutting edge 136 may impact the soil without leaving surface stubble untouched. More specifically, each tooth begins cutting where the previous tooth enters the soil.

Referring to FIG. 1, the tooth back 134 may be specifically shaped to pull the coulter blade 140 into the soil and maintain the rotation of the coulter blade 140. Much like a water wheel, each individual tooth back 134 provides the drive for the coulter blade 140 to rotate and minimize coulter blade 140 slippage. For example, a flat tooth back 134 may enable the desired drive force to cut the stubble and the soil while a flared or tooth back of increased surface area may enable a greater drive force if required.

In embodiments, the angle of tooth cutting surface may be altered for specific types of soil. For example, in heavy residue soil, the cutting edge 136 of each tooth may be lengthened to enable a pushing action as the cutting edge 136 of the tooth impacts the soil. In embodiments, a longer tooth may efficiently cut GMO stubble more effectively than a shorter tooth. A tooth measuring approximately three inches in length may allow for an efficient cut.

Figure 6:
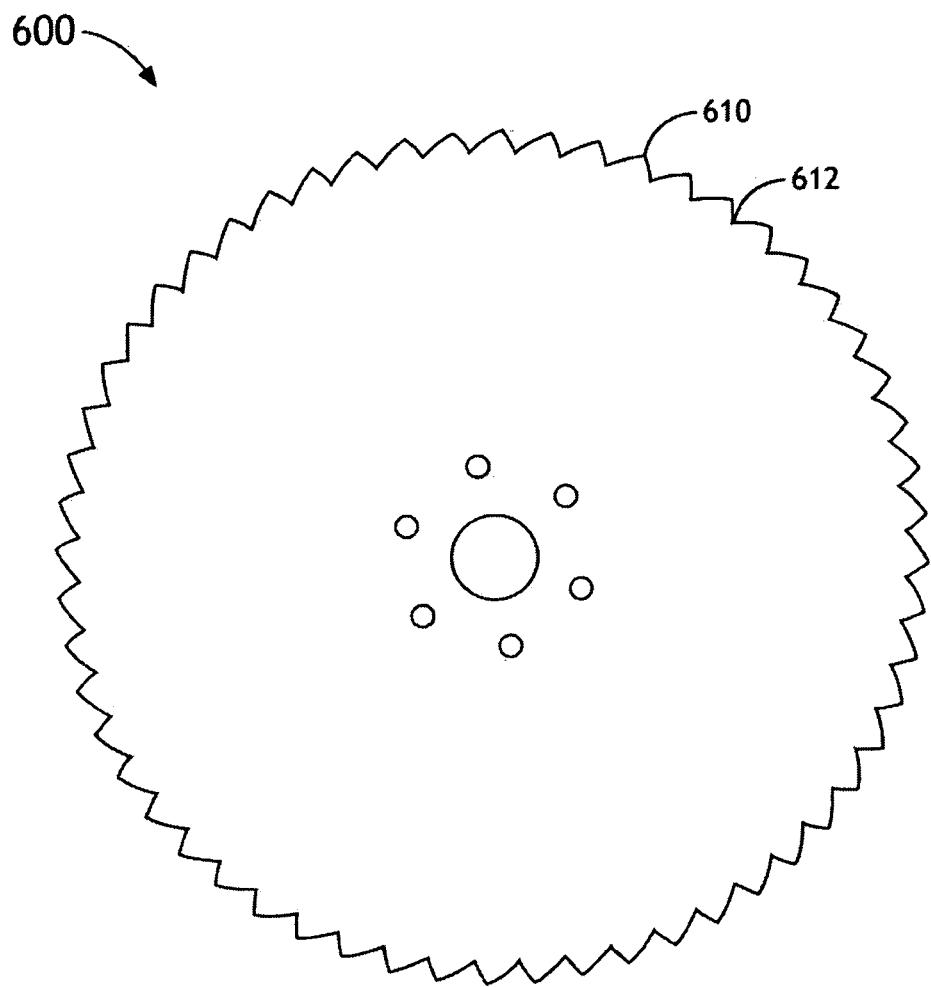
FIG. 6 is a diagram of a 56 tooth embodiment showing a sharp gullet exemplary of an embodiment of the present invention.

Referring to FIG. 6, a diagram of a 56 tooth embodiment showing a sharp gullet exemplary of an embodiment of the present invention is shown. In embodiments, a shorter tooth length with increased tooth numbers may enable an operator to achieve the desired tillage effect. For example, a short tooth 610 with a sharpened tooth gullet 612 may enable an accurate cut of a smaller gauge stubble such as oat stubble or wheat stubble.

Figure 7:
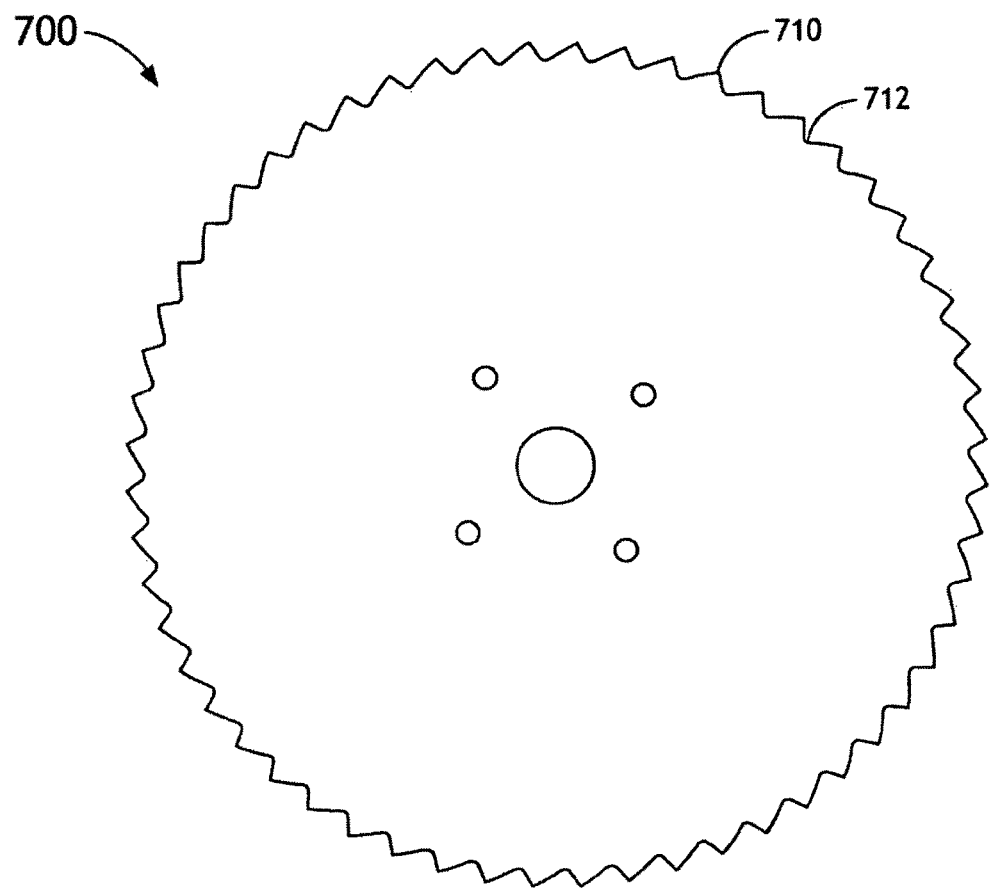
FIG. 7 is a diagram of a 56 tooth embodiment showing a rounded gullet exemplary of an embodiment of the present invention.

Referring to FIG. 7, a diagram of a 56 tooth embodiment showing a rounded gullet exemplary of an embodiment of the present invention is shown. In addition, a shorter tooth 710 with a rounded tooth gullet 712 may enable a sharpened tooth gullet 712 for increased cutting edge 136 surface area.

Figure 8:
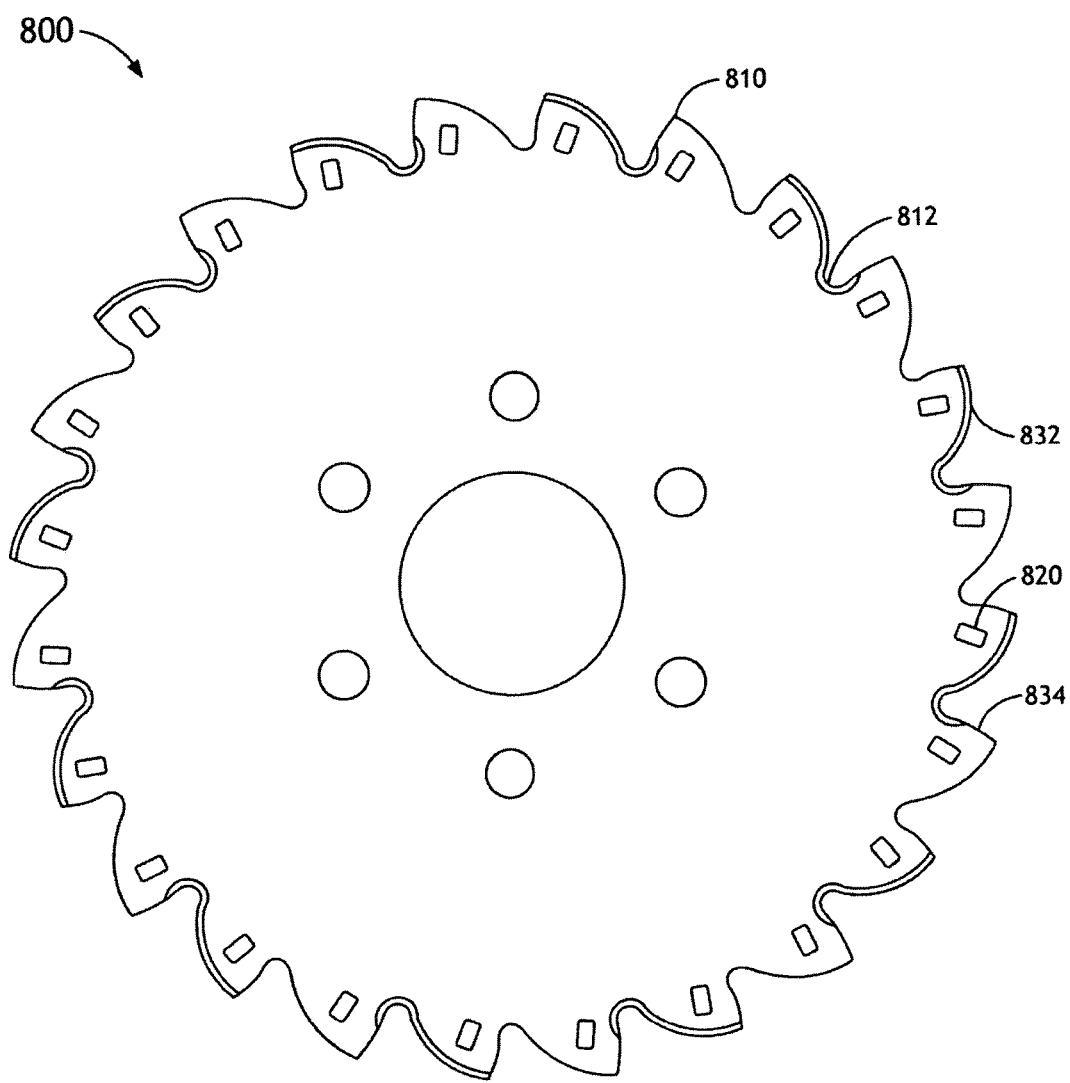
FIG. 8 is a diagram of an exemplary 24 tooth coulter blade with associated inserts in accordance with an embodiment of the present invention.

Referring to FIG. 8, a diagram of an exemplary 24 tooth coulter blade with associated inserts in accordance with an embodiment of the present invention is shown. In embodiments, the sabre tooth cutting edge 136 of each tooth 810 may remain unsharpened for optimal performance in specific types of soil. Alternatively, a coulter blade 140 designed for minimum till in heavy soil may be configured with teeth 810 optimally shaped for desired tillage and aeration. Additionally, a system 800 designed for low Cation-Exchange Capacity (CEC) soil and medium tillage may be optimally configured with teeth 810 shaped for the desired tillage. Additionally, a coulter blade 140 designed for full till/void creation for fertilizer injection may possess tooth 810 qualities and insert 820 size for optimal performance.

Blade Rotation as to the linear distance traveled: The STI series blade rotates up to 96% of linear distance traveled at hub depth or shallow depth. The STI series blade is driven by tooth 810 geometry and inserts 820. The backside of the tooth, shown as a vertical blunt edge at 834, tooth fillet or gullet 812, and the opposing tooth bevel pattern, acts to alternate soil contact pressures utilizing a forward driving force. This configuration and resultant forward driving force also keeps the blade in a straight linear motion rather than a side driven motion which would disadvantageously cause massive contact and friction. The configuration of the subject blade also acts to lessen sidewall compaction or pressure, thereby lessening blade friction and allowing easier rotation. See FIG. 1, 130-132-134. Bevel tooth angle or multiple tooth fillets and or seriation also may be provided. As well, a plurality of inserts may be installed in the blade, applied or multiple stamped protrusions to yield inserts 820. These unique novel structural features of the subject STI series blade result in the least amount of contact—least amount of time, so that the subject blade predominately only has soil contact on the outer circumference, thereby lessening friction by soil contact.

In embodiments, a cutting edge 136 of a sharpened tooth may possess a concave cutting surface as each tooth is sharpened. In embodiments, a tooth 810 as well as the tooth gullet 812 may be sharpened in an optimal configuration for the anticipated type of stubble. Additionally, the cutting surface of each may be optimally shaped in a sabre or curved shape 832 creating a friction cut as opposed to a pressure cut.

In FIG. 8, travel of the coulter blade 140 may be from left to right where the curved sabre side 832 of each tooth 810 is able to cut surface stubble at an optimum angle as the system 800 is operated at the optimum depth.

A curved cutting edge 832 on each tooth may allow efficient cut of GMO refuge stubble material. Preferably, each tooth 810 is sized to maintain a cutting surface proximal to the cutting surface of the adjacent tooth. For example, a first tooth may cut a two-inch surface of the soil while the adjacent tooth will cut the next two inches of soil with no gap in cut surface of the soil. Each tooth back 834 may be specifically shaped and adjusted to help pull the coulter blade 140 into the soil and drive the rotation of the coulter blade 140 and minimize coulter blade slippage.

Figure 9:
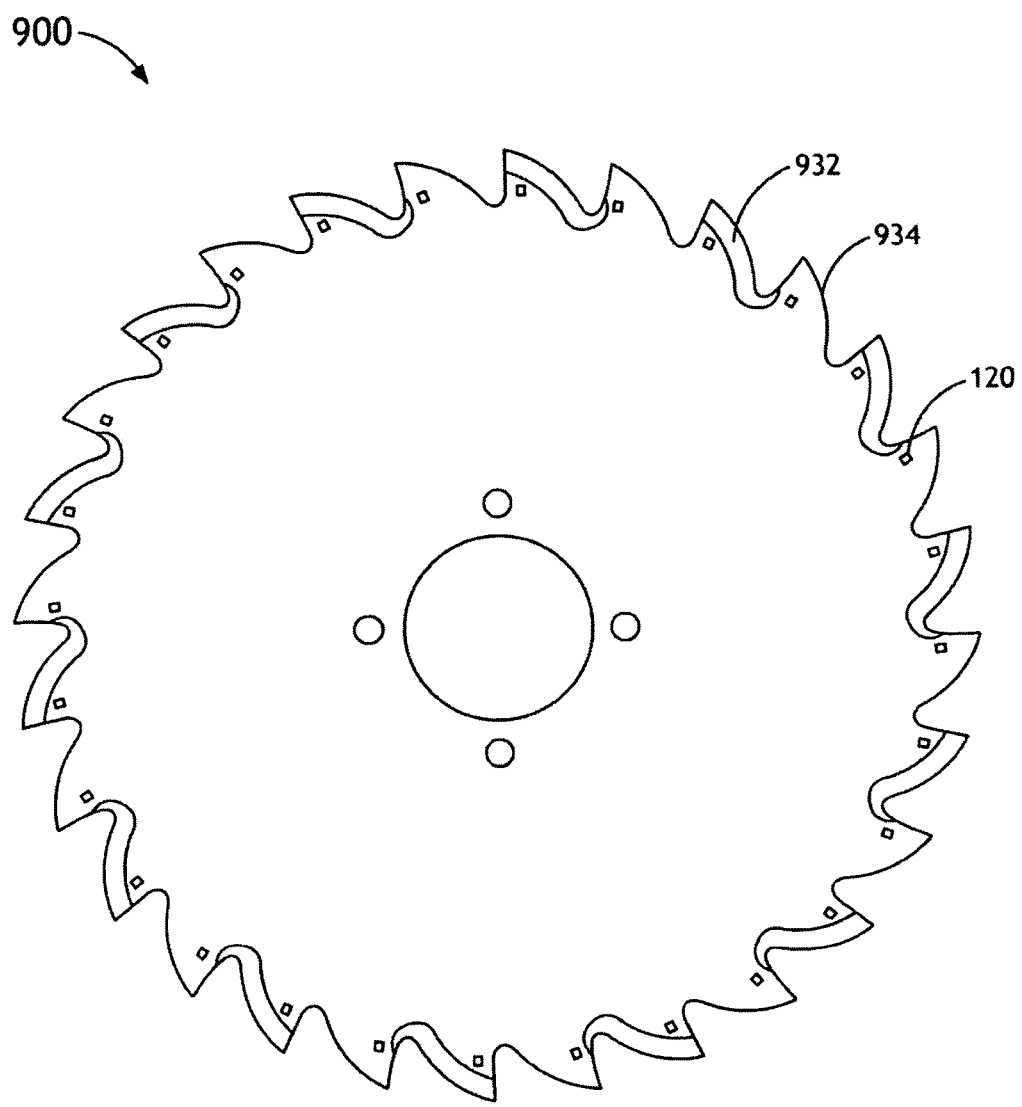
FIG. 9 is a diagram of a blade with associated 28 teeth and 28 inserts in accordance with an embodiment of the present invention.

Referring to FIG. 9, a diagram of a blade with associated 28 teeth and 28 inserts in accordance with an embodiment of the present invention is shown. Preferably, adjacent teeth are sharpened on alternating sides 932, 934 to eliminate sidewall force as the teeth interact with the soil. As each tooth enters and cuts the soil, skilled artisans will recognize the angle of sharpening will create a lateral force away from the sharpened surface. Embodiments of the present invention may offset this lateral force with and opposite lateral force of the adjacent tooth.

Figure 10:
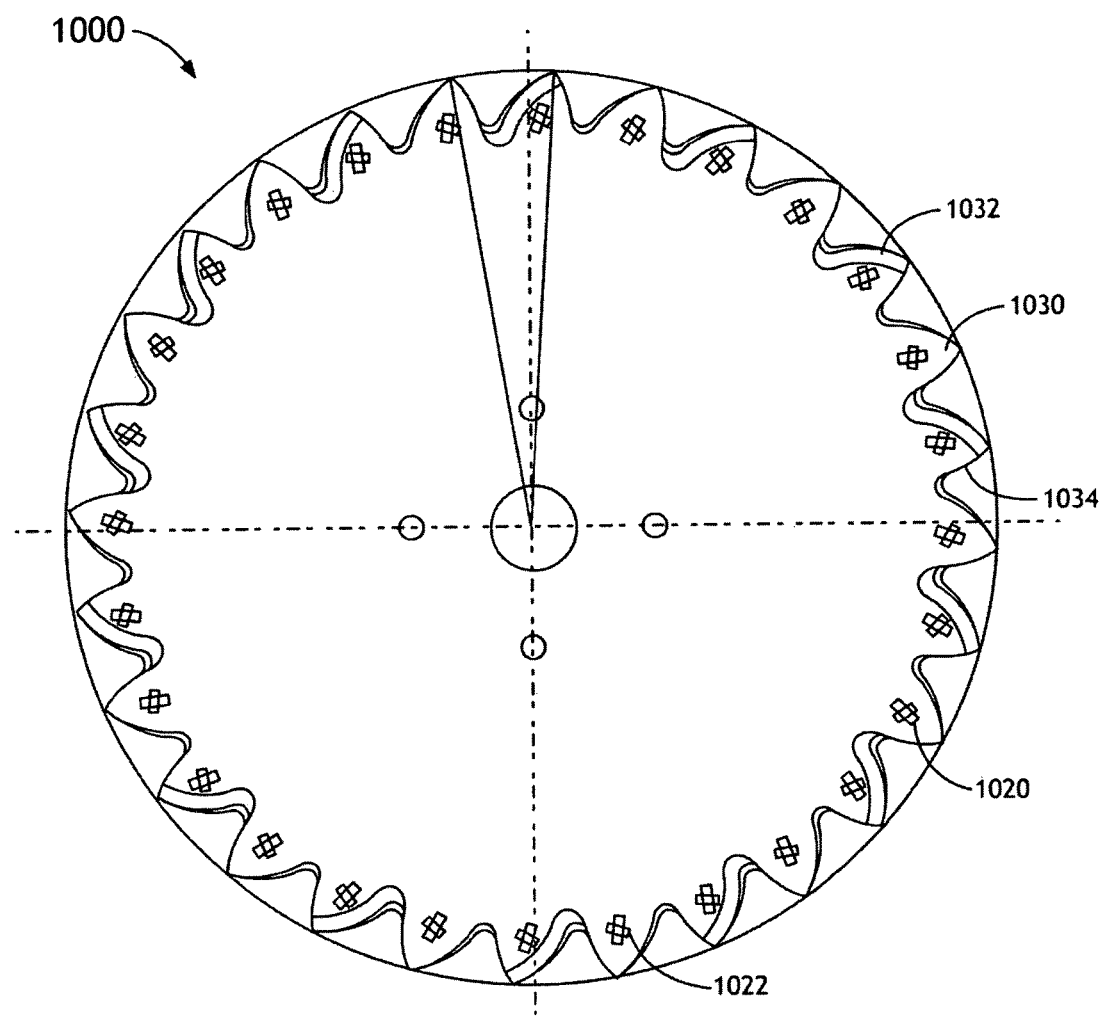
FIG. 10 is a diagram of a blade with associated 28 teeth and 28 angled inserts in accordance with an embodiment of the present invention.

Referring to FIG. 10, a diagram of a blade with associated 28 teeth and 28 angled inserts in accordance with an embodiment of the present invention is shown. Teeth 1030 are shown having specifically designed angled inserts 1020, 1022. Insert angle may be specifically designed for the type of soil and for a desired angle of insert soil penetration. For example, as system 1000 moves from right to left and tooth back 1034 pulls the coulter blade 140 through the soil, insert 1022 may penetrate the soil at nearly a 90-degree angle and exit the soil at approximately 30-degree angle relative to the soil surface. Should system be fitted with insert 1020, insert 1020 may penetrate the soil at approximately a 30-degree angle but exit the soil at a 45-degree angle. This variable angle may increase the desired subsoil removed to the surface as well as increase the fracturing effect of the inserts as they interact with the soil.

Figure 11:
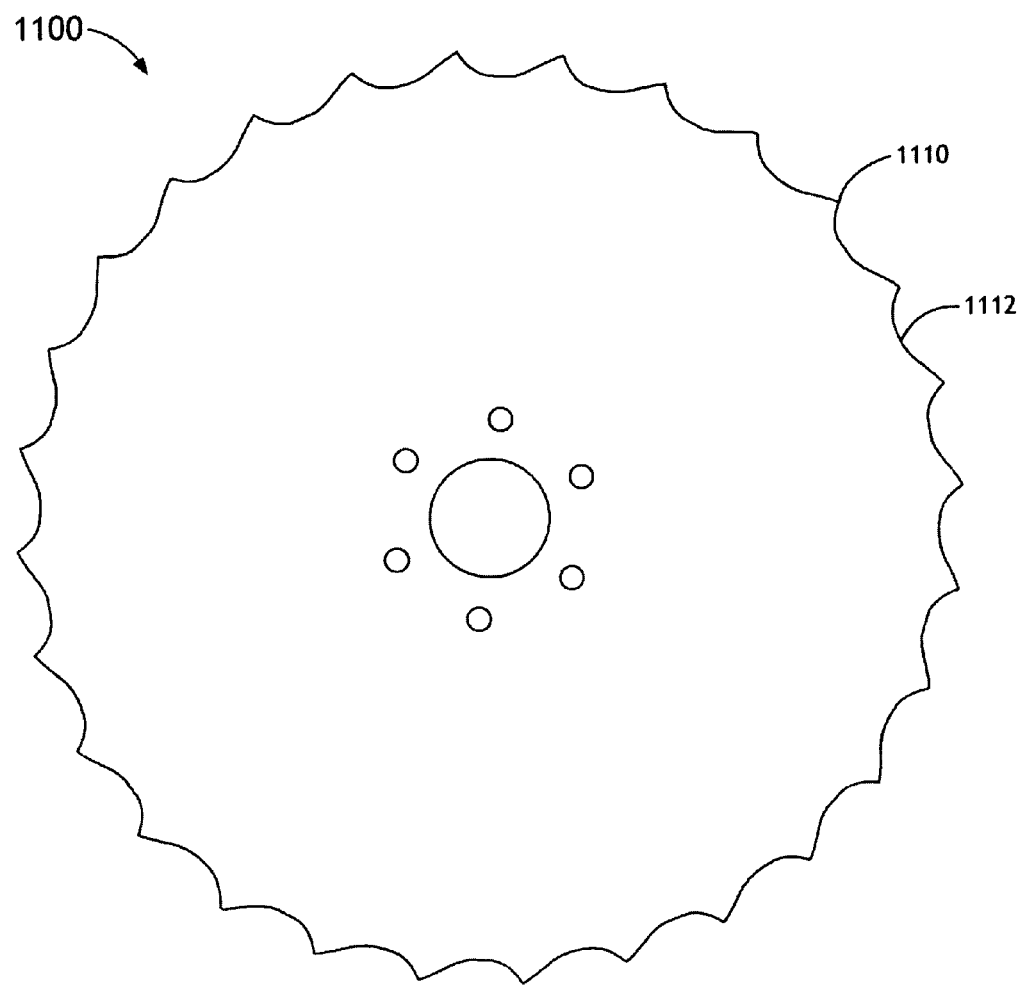
FIG. 11 is a diagram of an exemplary coulter blade with associated 28 teeth of shorter gullet depth in accordance with an embodiment of the present invention.

Referring to FIG. 11, a diagram of an exemplary coulter blade with associated 28 teeth of shorter gullet depth in accordance with an embodiment of the present invention is shown. Shortened teeth 1110 and shallow tooth gullet 1112 may decrease possible tooth breakage as coulter blade 140 may interact with soil of hardened or rocky nature. Smaller, shorter backside teeth can be used for shallow depth applications.

Figure 12:
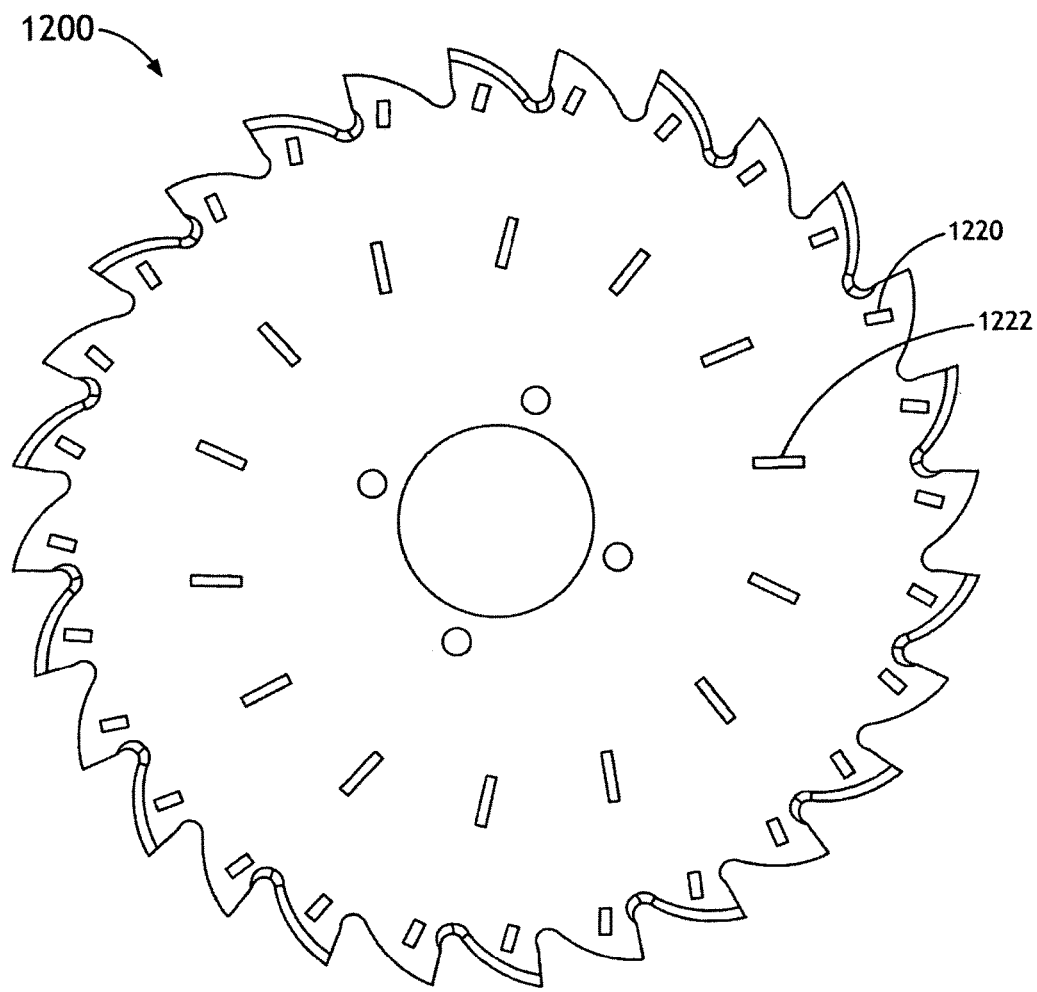
FIG. 12 is a diagram of an exemplary coulter blade with 28 teeth and associated outer and inner inserts in accordance with an embodiment of the present invention.

Referring to FIG. 12, a diagram of an exemplary coulter blade with 28 teeth and associated outer and inner inserts in accordance with an embodiment of the present invention is shown.

Insert Location

Referring to FIGS. 12 and 39, it is further contemplated herein; variable insert 1220 location may offer desired tillage and aeration qualities capable of the variable tooth coulter blade 140. An insert 1220 positioned distally from the hub of the coulter blade 140 may provide a greater tillage effect for creating a void capable of receiving an additional element, for example, a planting device placing seeds into the void and a fertilizing device filling the void with a fertilizer. An additional plurality of inserts 1222 may be located at a second radius from the blade hub 150 to allow an operator more flexibility in soil aeration. For example, an inner circle of inserts 1222 may allow for surface soil aeration, mulching and tillage while the outer row of inserts 1220 may allow for subsoil aeration. It is contemplated herein; multiple circles of inserts may function within the scope of the present invention, each circle providing separate function at the desired depth of operation.

For example, at an exemplary depth where proximal inserts 1222 are embedded in the soil, both the proximal insert 1222 and the distal insert 1220 are interacting with the soil. However, if an operator were to reduce the depth, the entirety of the distal insert 1220 impacts the soil while only a portion of the proximal insert 1222 impacts the soil.

Referring to FIG. 13a-13E, diagrams of exemplary coulter blades with variable tooth number, tooth size, insert number and size, and gullet depth in accordance with embodiments of the present invention are shown. Inserts 120 may be of variable size and shape. Further, inserts 120 may be placed at a plurality of locations within the coulter blade 140 to optimally impact the type of soil anticipated.

It is contemplated a plurality of designs of coulter blades 140 having a variety of number of teeth and inserts 120 may be incorporated within the scope of the present invention. Without limitation, each embodiment shown in FIGS. 13A, 13B, 13C, 13D, and 13E may be one example of many contemplated herein. FIG. 13A shows an exemplary 16 tooth design, each tooth having an optimum tooth cutting edge to cover the circumference of the coulter blade 140. FIG. 13B shows a 20 tooth design with additional surface area available for cutting. FIG. 13C shows a 24 tooth design with 24 inserts 120 capable of impacting a greater quantity of soil. FIG. 13D shows a 28 tooth design with as many inserts 120. FIG. 13E shows a 32 tooth and insert 120 design of the present invention. Alternatively, in FIG. 13E, inserts 120 may be exemplarily placed at every other tooth allowing for 32 teeth and 16 inserts 120.

Skilled artisans will realize with more teeth may come additional surface area for cutting various sizes of stubble. However, more teeth also may contribute to tooth breakage leading to a balance between tooth number and the type of soil anticipated by the operator.

Insert Angle

Figure 14:
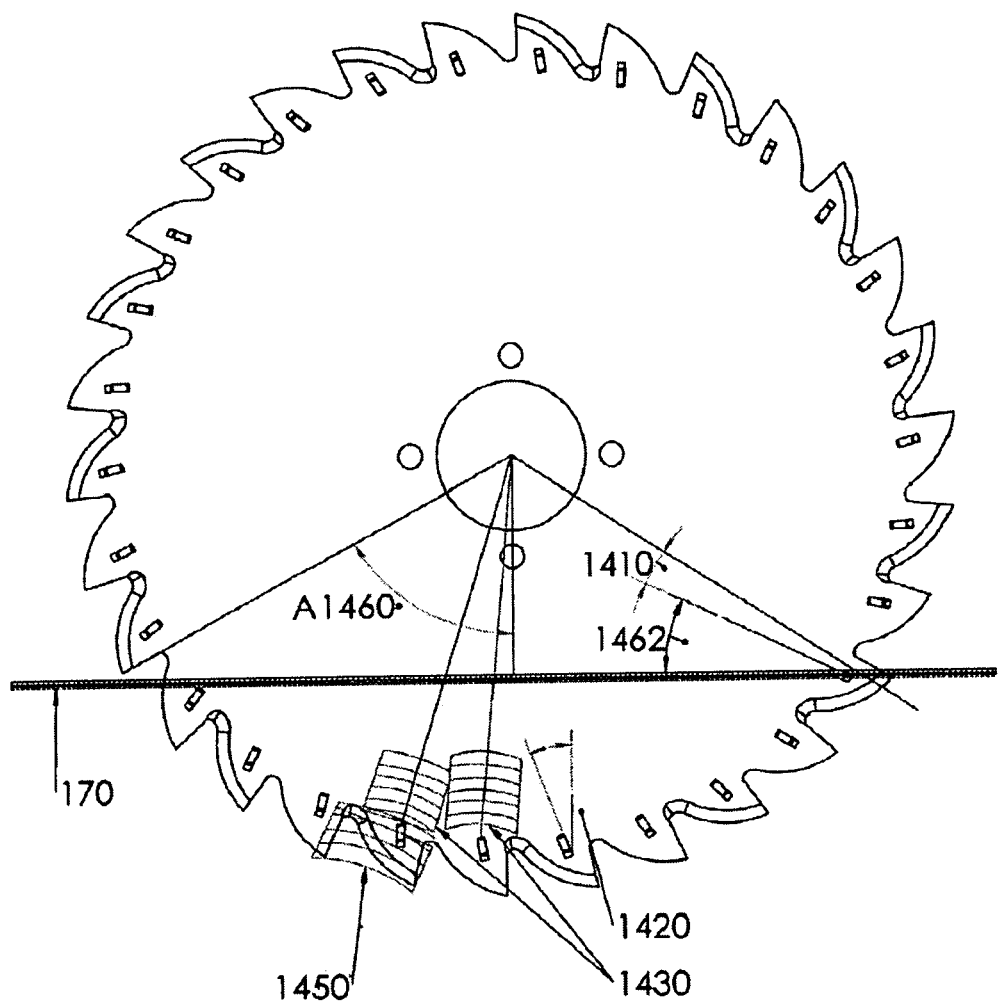
FIG. 14 is a diagram of an exemplary 32 tooth embodiment indicating insert rotational motion as the insert traverses the soil in accordance with an embodiment of the present invention.

Referring to FIG. 14, a diagram of an exemplary 32 tooth embodiment indicating insert rotational motion as the insert traverses the soil in accordance with an embodiment of the present invention is shown. The angle b 1462 of insert 120 placement may also be manipulated for optimal performance. As exemplarily indicated, inserts 120 are positioned at angle b 1462 approximately 30 degrees from the surface. As the coulter blade 140 moves from right to left here, inserts 120 may vertically transverse into the soil to the maximum depth vertically beneath the blade hub 150. As the coulter blade 140 moves left, the insert 120 decreases in depth and exits the soil. During this down then up translation, insert 120 is also undergoing rotation about the blade hub 150 equal to double the angle of impact at 1430. With a 30-degree penetration angle and a 120-degree exit angle, the soil touched by insert 120 is impacted and fractured based on the rotation.

With an alteration of the angle of the insert 120, the operation of the insert 120 in contact with the soil is altered. For example, an insert 120 angled to penetrate the soil at a 90-degree angle of penetration may aerate differently than an insert 120 placed to enter the soil at a 45-degree angle of penetration. A slight change in insert angle b 1462 may greatly influence the amount of soil brought to the surface after coulter blade 140 interaction. In embodiments, an insert 120 may penetrate the surface of the soil at a relatively flat 0 degrees from horizontal and exit the surface of the soil after approximately 135 degrees of rotation.

For example, an operator with a CEC of 20 may have a large amount of surface stubble where the operator desires more dark soil on the surface located in a northern climate. In this case, the angle b 1462 of the insert 120 may be optimally positioned for greater soil movement to the surface. For example, an insert 120 with in impact angle b 1462 of 30 degrees may enter the soil 170 at 30 degrees and rotate to 120 degrees before fully exiting the soil. This rotation of the insert 120 as well as the change in depth (from zero to the desired depth (here an exemplary four inches)) of the insert.

It may or may not be necessary to alter the size and shape of the insert 120 as the angle change of the insert 120 may be sufficient to transfer the desired amount of soil to the surface. For example, a curved insert may be able to act in a shoveling manner to enter the soil at 90 degrees and exit the soil at a nearly level orientation to maximize the soil brought to the surface.

In another embodiment, the operator in heavy gumbo with tight soil may desire simply more tillage. In this case, the insert 120 may be widened to create more surface area for the insert 120 to interact with the soil.

It is contemplated herein, a prescription insert 120 designed for a specific type of soil may enable an operator the flexibility to attain the desired till and aeration. A first operator tilling a first specific type of soil may desire a first size, shape, and angle of insert 120 while a second operator tilling a second specific type of soil may desire a second size, shape, and angle of insert 120.

Figure 15A:
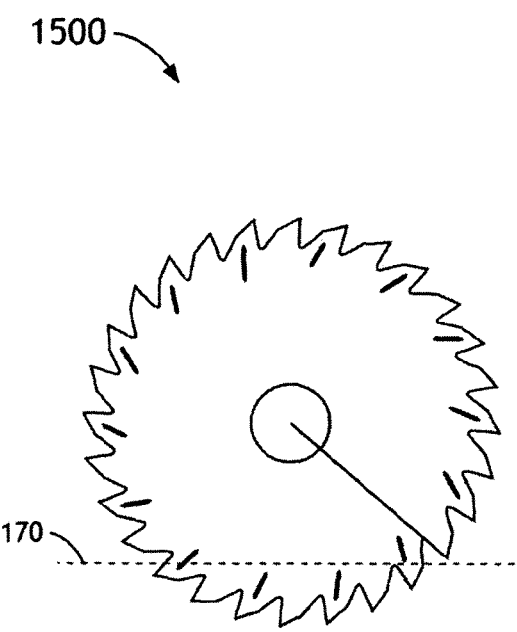
FIGS. 15A-15D are diagrams of insert effect on the soil at various blade depths in accordance with embodiments of the present invention.
Figure 15B:
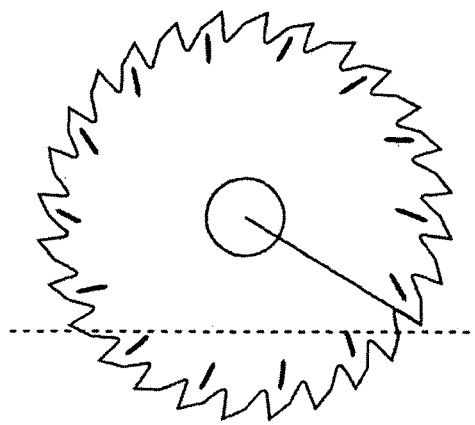
Figure 15C:
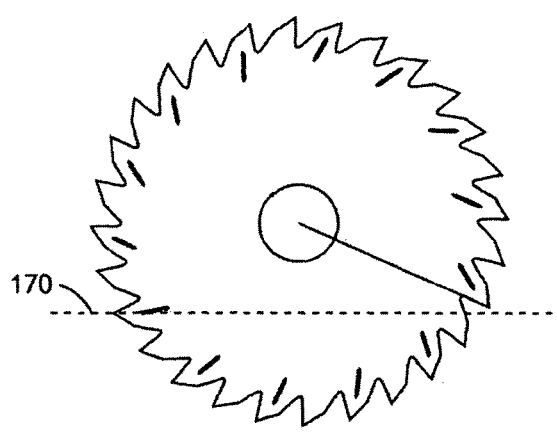
Figure 15D:
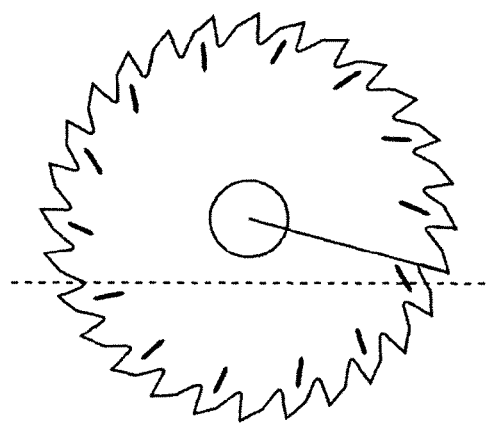
Figure 16A:
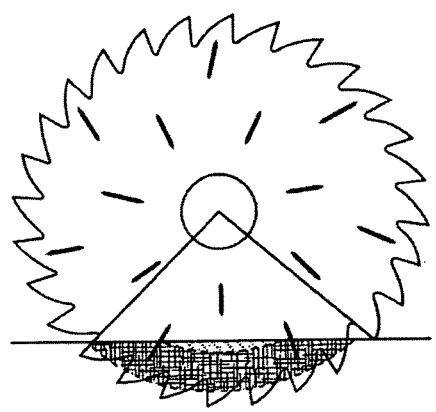
FIGS. 16A-16D are diagrams of sidewall pressure the insert effect on the soil at various blade depths in accordance with embodiments of the present invention.
Figure 16B:
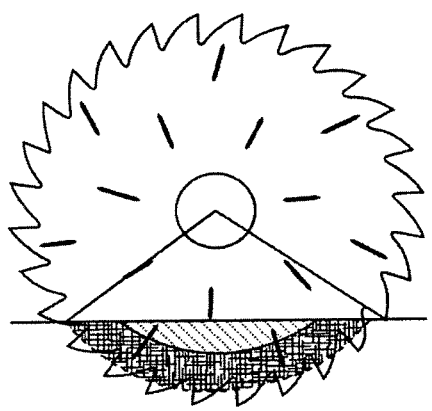
Figure 16C:
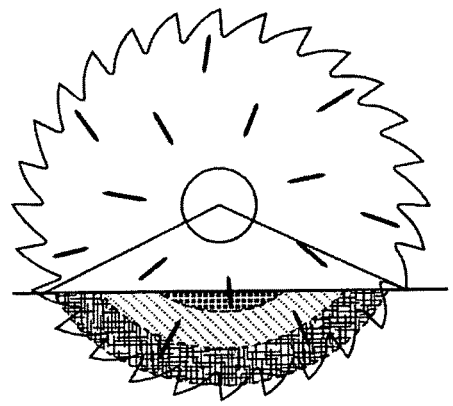
Figure 16D:
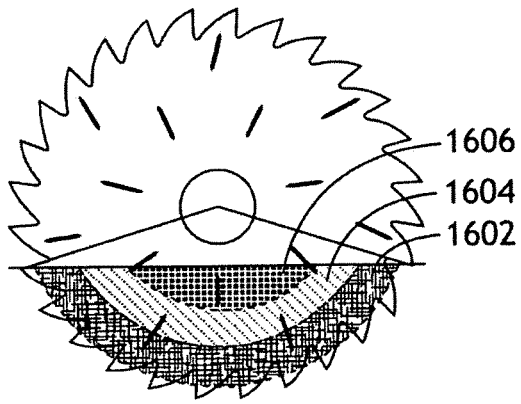

Referring to FIG. 15A-15D, diagrams of insert effect on the soil at various blade depths in accordance with embodiments of the present invention are shown. The angle of soil 170 entry of each tooth 110 and insert 120 may be altered by the soil depth at which the coulter blade 140 is operated. For example, at an exemplary depth of 3.25 inches in FIG. 15A, an insert 120 may enter the soil at an angle of approximately 45 degrees from horizontal and exit the soil after approximately 90 degrees of travel. Conversely, at a greater depth as shown in FIG. 15B, an insert 120 may impact the soil at approximately 40 degrees from horizontal and exit the soil after 110 degrees of rotation. Similarly, for FIG. 15C, insert 120 enters the soil at 20 degrees and exits after 120 degrees of rotation. Similarly, for FIG. 15D, insert 120 enters the soil at 0 degrees and exits after 135 degrees of rotation. This difference may allow an operator to accurately determine an amount of soil to impact, aerate, and bring to the surface.

Referring to FIG. 16A-16D, diagrams of sidewall pressure the insert effect on the soil at various blade depths in accordance with embodiments of the present invention are shown. An additional goal of the invention may include a coulter blade 140 able to cut and aerate the soil with minimal lateral pressure on the soil as the coulter blade 140 interacts with the soil. This undesirable lateral pressure or sidewall push (a lateral force on the soil as the blade interacts) may cause a smearing or trowelling action as a result of blade soil interaction creating a compacted soil barrier impenetrable by a future root system. Each tooth on the variable tooth coulter blade 140 may be sharpened only on one side, while the adjacent tooth is sharpened on the opposite side. This alternate sharpening may eliminate overall coulter blade 140 sidewall push by opposite and counteracting lateral pressure of each tooth as the tooth interacts with the soil.

An additional goal of the present invention may include a minimum amount of friction along the sidewall of the coulter blade 140. Any amount of friction along the sidewall of the coulter blade 140 causes an increase amount of force required to pull the coulter blade 140 through the soil. As an object enters the soil, the surrounding soil tends to grip or hold on to the object. Soils with a higher CEC have a greater ability to grasp the object. As the coulter blade 140 depth increased, area 1602 may be the only sidewall interacting with the soil. As depth in increased, areas 1604 and 1606 become engaged with the soil thus increasing the need for sidewall pressure reduction. Embodiments of the present invention create a contact area limited to the portion of the coulter blade 140 more distal from the hub where the sidewall of the coulter blade 140 closer to the hub remains free from soil contact.

Alternatively, a coulter blade 140 of the present invention may be shaped in a concave design to enable side movement of soil as well as cutting of stubble, mulching and tillage on the surface. For example, a plurality of concave coulter blade 140s may act to cut the stubble on the surface of the field as well as slightly move the soil laterally after soil aeration.

Further, it is contemplated embodiments of the present invention may include a coulter blade 140 for interacting with the side walls of a trench to back fill the void above the trench contents. For example, a trench dug for tile requires backfill after the tile/cable has been laid. Embodiments of the present invention interact with the soil on the sides of the trench as a closing wheel to fill the void above the tile. This backfill creates the archway above the tile preventing the tile from being crushed from additional weight.

Referring to FIGS. 17A and 17B, diagrams of exemplary inserts in accordance with an embodiment of the present invention are shown. An additional goal of the present invention may include aeration of the soil with which the variable tooth coulter blade 140 makes contact. Variable size, angle, and number of inserts 1720, 1722 aerate the soil with which the coulter blade 140 comes into contact. The inserts 120 dig as low as the operator desires and aerate the sub compacted soil sufficiently to aid in follow on root penetration. Securably mounted along lines 1730 of coulter blade insert opening alignment, the lateral extension of each insert 1720, 1722 may impact the soil.

As each insert 1720, 1722 interacts with the soil, the insert 1720, 1722 will also aerate soil adjacent to the soil directly touched by the insert 1720, 1722. This adjacent aeration effect allows for the operator to create the desired tillage by manipulation of the speed of the vehicle and depth of the coulter blade 140. The greater the speed of the vehicle, the greater the adjacent aeration effect. Preferably a minimum speed may be in the range of two to five miles per hour while a maximum speed may be in the range of eight to ten miles per hour. It is contemplated herein; speeds less than two or greater than ten miles per hour may also be optimal for coulter blades 140 described within the scope of the present invention.

Insert Width

The width of the insert 1720, 1722 may determine an amount of soil desired to be altered. For example, a wider insert 1720 extending laterally from the blade 140 may contact a greater amount of soil causing the greater amount of soil to be fractured and aerated. Conversely, a narrower insert 1722 may preclude insert breakage should the coulter blade 140 contact a rock.

Insert Size and Shape

The shape and size of the insert 1720, 1722 may determine the amount of aeration of the soil as well as resistance to breakage in certain types of soil. For example, in rocky soil, a more robust insert 1722 may resist breakage as a result of impact with a rock. For example, in heavy soil, an insert 1720, 1722 of square shape may optimally interact with the heavy soil. In light soil, an insert 120 of tapered or swept shape may allow for less contact with the soil while optimally aerating the soil.

Figure 18:
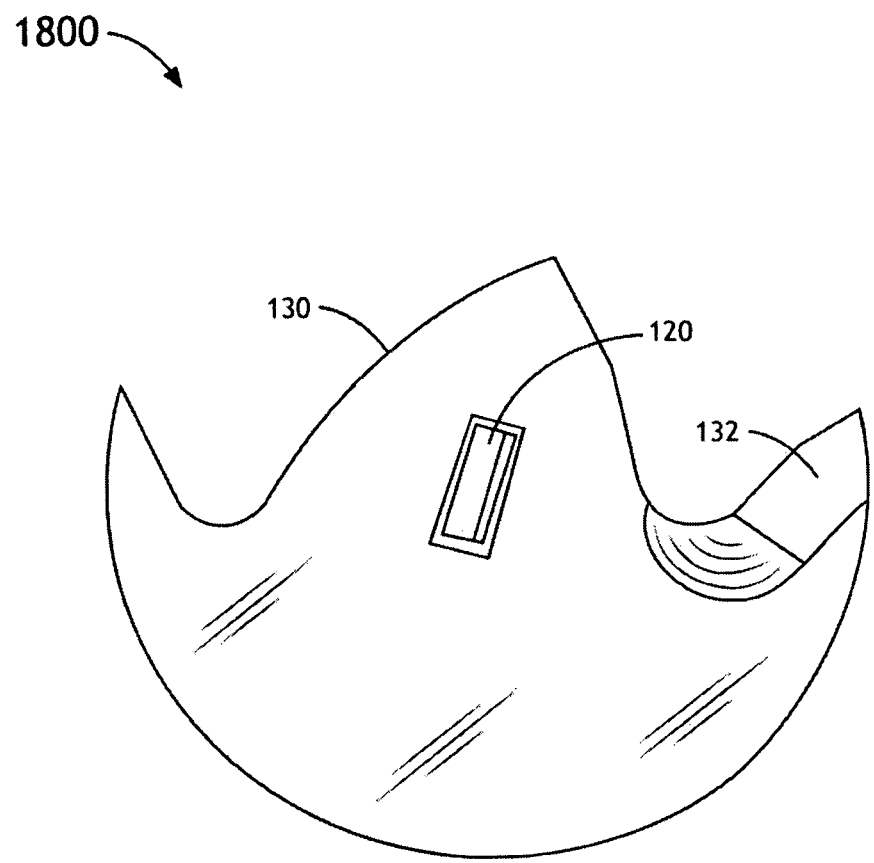
FIG. 18 is a detail diagram of exemplary insert location and size in accordance with an embodiment of the present invention.

Referring to FIG. 18, a detail diagram of exemplary insert location and size in accordance with an embodiment of the present invention is shown. The angle of the insert 120 may determine penetration as well as aeration of the soil. Insert 120 positioned near the blade circumference within tooth 130 may provide greater aeration than would an insert more proximal to the blade hub.

Figure 19B:
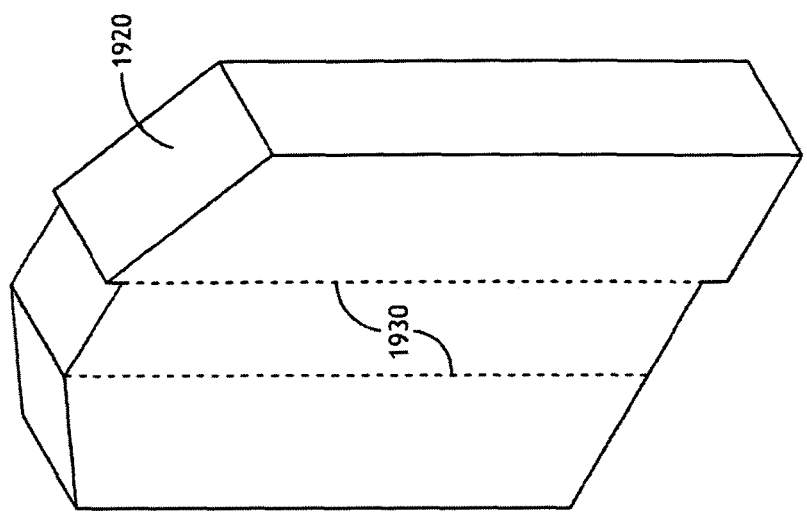
FIGS. 19A and 19B are diagrams of one insert exemplary of an embodiment of the present invention.
Figure 19A:
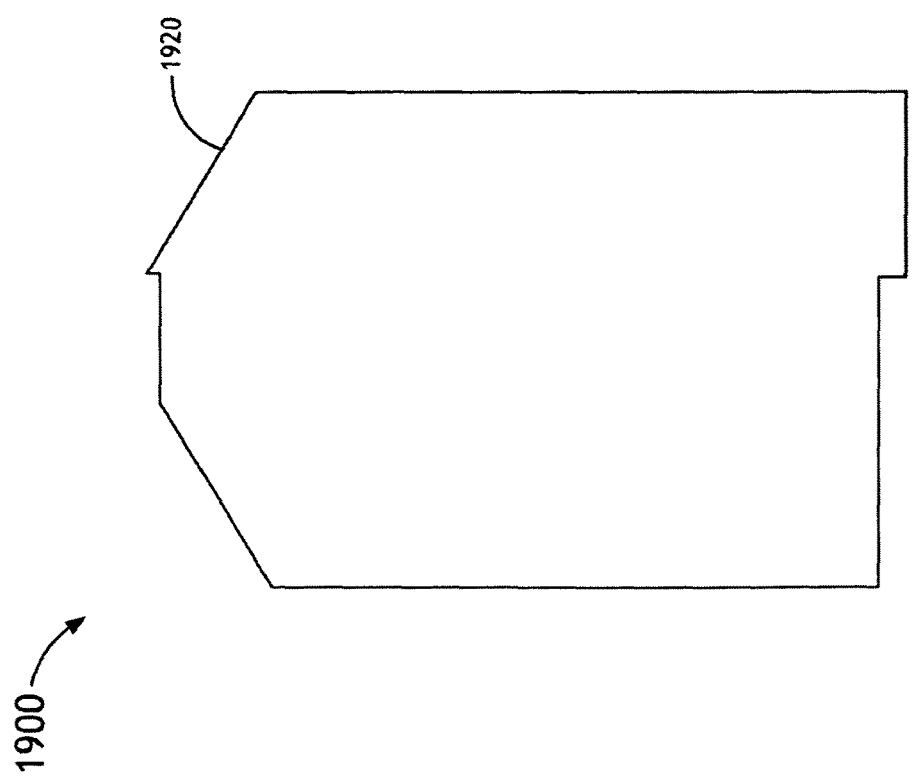

Referring to FIGS. 19A and 19B, diagrams of one insert exemplary of an embodiment of the present invention are shown. One embodiment of insert 1920 may include an insert mountable within coulter blade insert opening from one lateral side. Mounted along alignment lines 1930, insert 1920 may be more easily mounted with a weld required on one side. It is contemplated herein; equal surface areas on insert 1920 lateral extensions may enable equal forces on the insert 1920. For example, flanged side of insert 1920 may extend laterally a lesser amount than non-flanged side of insert 1920 to enable equal pressure on both lateral extensions.

Figure 20B:
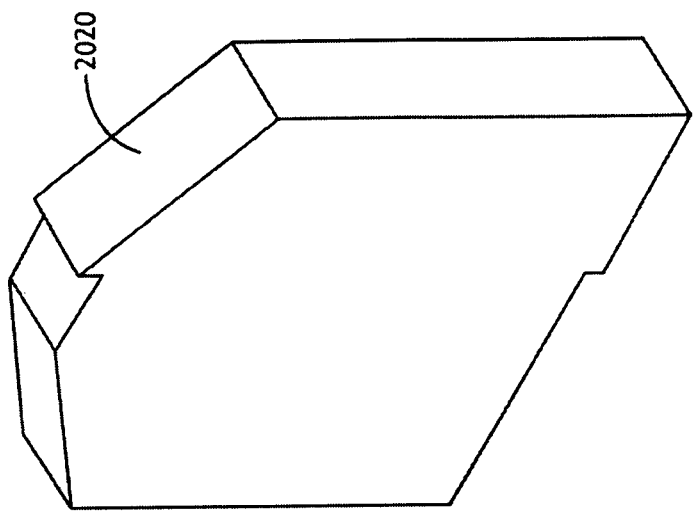
FIGS. 20A and 20B are diagrams of one insert exemplary of an embodiment of the present invention.
Figure 20A:
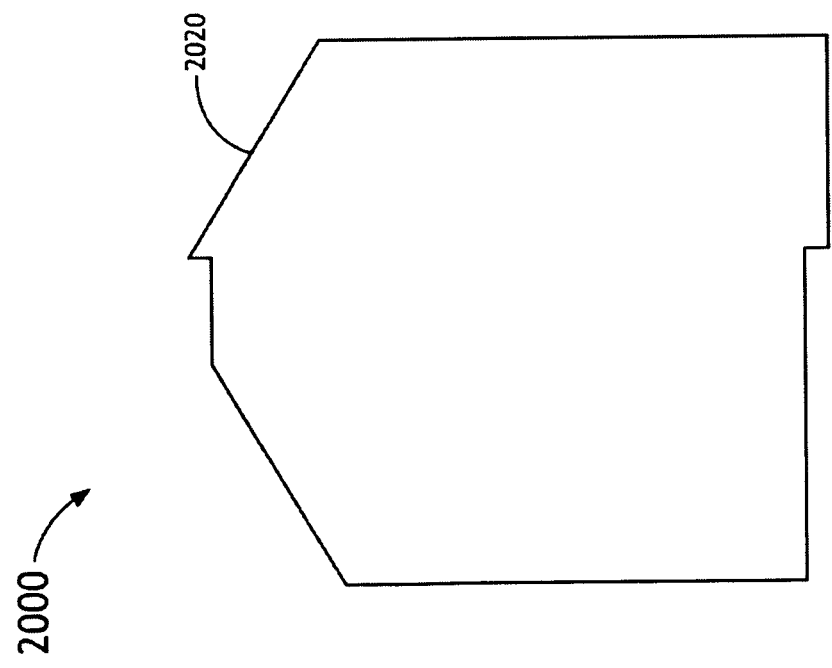

Referring to FIGS. 20A and 20B, diagrams of one insert exemplary of an embodiment of the present invention are shown. An additional embodiment of insert 2020 may enable a greater amount of insert soil interaction.

Referring to FIG. 21, there is shown a flowchart for a method for altering surface stubble while simultaneously mulching, tilling and aerating the soil exemplary of an embodiment of the present invention. Method 2100 may begin at step 2102 with embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement. Method 2100 continues with step 2104 with translating the discoidal coulter blade through the soil at a depth via the implement and, at step 2106 with cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge. Method 2100 may conclude with step 2108 with aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

FIGS. 28A-I are diagrams of exemplary inserts in accordance with an embodiment of the present invention, particularly showing a bubble blade insert. Bubble blade 28140 exemplary of the present invention may include a single tooth cutting edge 28136. A plurality of inserts 28120 are shown interwebbed with one another, and function and operate as discussed hereinabove.

FIGS. 29A-I are diagrams of exemplary inserts in accordance with an embodiment of the present invention, particularly showing a notch blade insert. Notch blade 29140 exemplary of the present invention may include a plurality of teeth 29110 each having a tooth cutting edge 29136. Between each tooth 29110, a gullet 29112 may retain specific qualities for tooth effectiveness. A plurality of inserts 29120 are shown, which function and operate as discussed hereinabove.

FIGS. 30A-I are diagrams of exemplary inserts in accordance with an embodiment of the present invention, particularly showing a razor blade insert. Razor blade 30140 exemplary of the present invention may include a plurality of teeth 30110 each having a tooth cutting edge 30136. Between each tooth 30110, a gullet 30112 may retain specific qualities for tooth effectiveness. A plurality of inserts 30120 are shown, which function and operate as discussed hereinabove.

FIGS. 31A-I are diagrams of exemplary inserts in accordance with an embodiment of the present invention, particularly showing a ripple blade insert. Ripple blade 31140 exemplary of the present invention may include a plurality of teeth 31110 each having a tooth cutting edge 31136. Between each tooth 31110, a gullet 31112 may retain specific qualities for tooth effectiveness. A plurality of inserts 31120 are shown, which function and operate as discussed hereinabove.

FIGS. 32A-I are diagrams of exemplary inserts in accordance with an embodiment of the present invention, particularly showing a Sameri blade insert. Sameri blade insert 32140 exemplary of the present invention may include a plurality of teeth 32110 each having a tooth cutting edge 32136. Between each tooth 32110, a gullet 32112 may retain specific qualities for tooth effectiveness. A plurality of inserts 32120 are shown, which function and operate as discussed hereinabove.

FIGS. 33A-I are diagrams of exemplary inserts in accordance with an embodiment of the present invention, particularly showing a straight blade insert. Straight blade 33140 exemplary of the present invention may include a single tooth cutting edge 33136. A plurality of inserts 33120 are shown, which function and operate as discussed hereinabove.

FIGS. 34A-I are diagrams of exemplary inserts in accordance with an embodiment of the present invention, particularly showing a turbo blade insert. Turbo blade 34140 exemplary of the present invention may include a plurality of teeth 34110 with a gullet 34112 and a plurality of inserts 34120, which function and operate as discussed hereinabove.

FIGS. 35A-I are diagrams of exemplary inserts in accordance with an embodiment of the present invention, particularly showing a vortec blade insert. Blade 35140 exemplary of the present invention may include a plurality of teeth 35110 with a gullet 35112 and a plurality of inserts 35120, which function and operate as discussed hereinabove.

FIGS. 36A-I are diagrams of exemplary inserts in accordance with an embodiment of the present invention, particularly showing a wavy blade insert. Blade 36140 exemplary of the present invention may include a plurality of teeth 36110 with a gullet 36112 and a plurality of inserts 36120, which function and operate as discussed hereinabove.

FIGS. 37A-F are diagrams of exemplary fillets, True V Extended Fillet and True V Mate Taper, in accordance with an embodiment of the present invention.

Figure 38A:
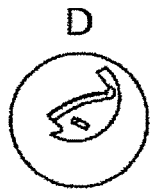
FIGS. 38A-I are diagrams of exemplary serrated cutting edges, serrate 1 (FIG. 38A-38C), serrate 2 (38D-38F), and serrate 3 (38G-38I), in accordance with an embodiment of the present invention.
Figure 38B:
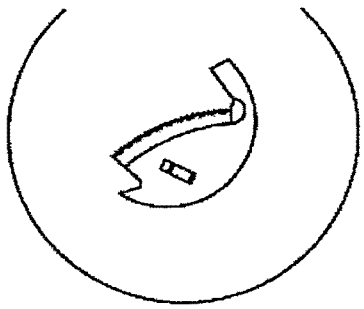
Figure 38C:
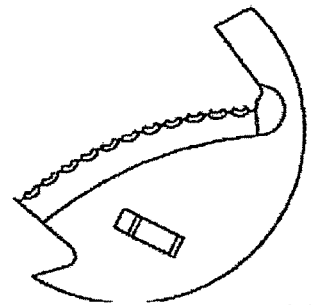
Figure 38D:
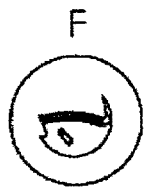
Figure 38E:
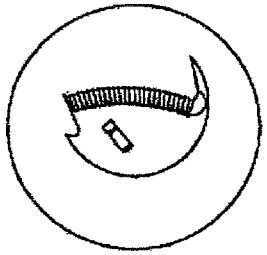
Figure 38F:
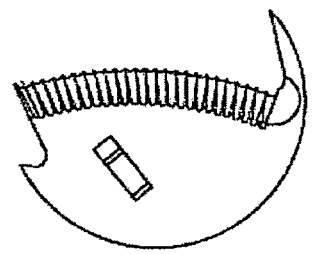
Figure 38G:
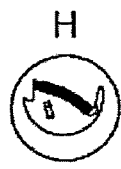
Figure 38H:
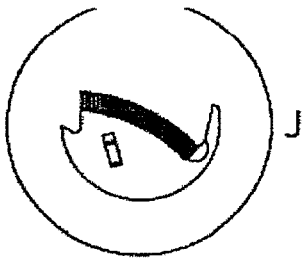
Figure 38I:
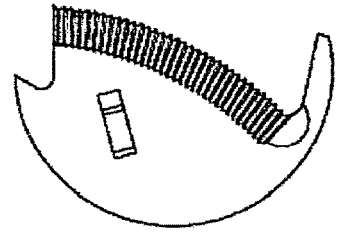
Figure 39A:
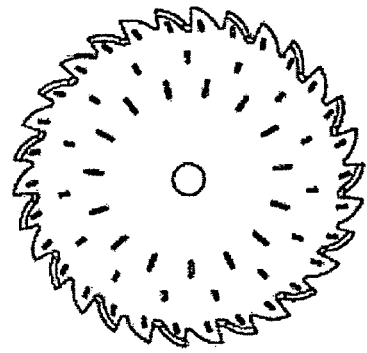
FIGS. 39A-I are diagrams of exemplary inserts in accordance with an embodiment of the present invention, particularly showing multiple insert blade.
Figure 39B:
Figure 39C:
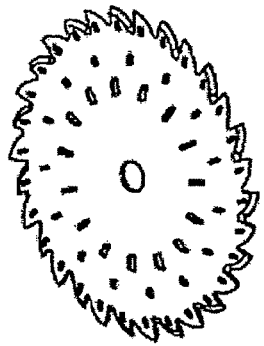
Figures 39D, 39E, 39F:
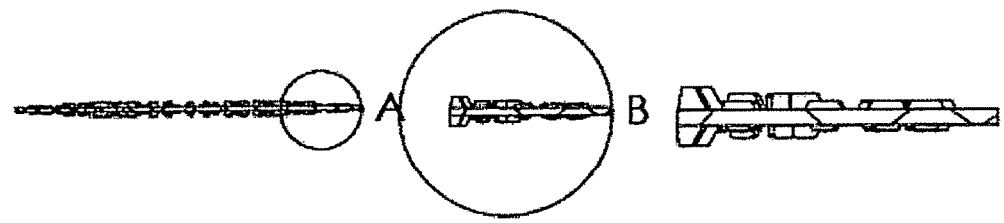
Figure 39G:
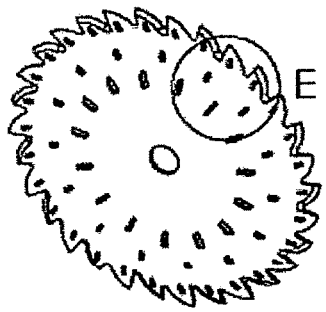
Figure 39H:
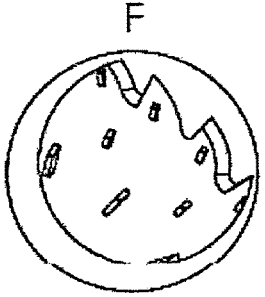
Figure 39I:
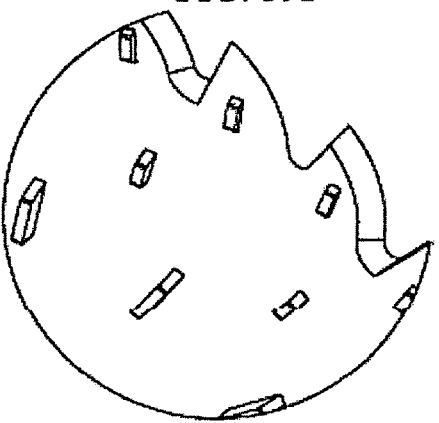
Figures 40A, 40B, 40C, 40D, 40E, 40F:
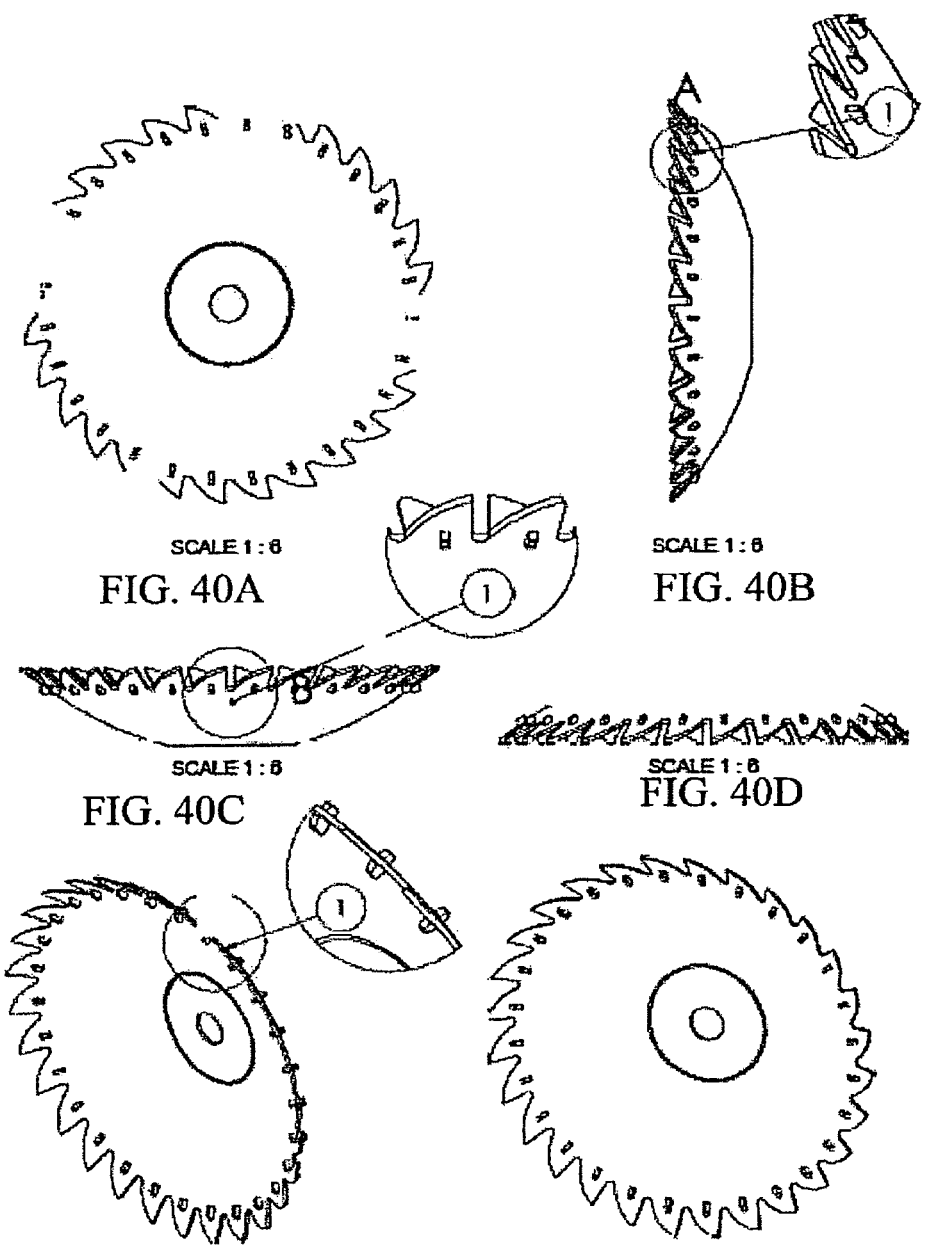
FIGS. 40A-F are diagrams of exemplary inserts in accordance with an embodiment of the present invention, particularly showing curved/concave multiple insert blade.

FIGS. 38A-1 are diagrams of exemplary serrated cutting edges, serrate 1 (FIG. 38A-38C), serrate 2 (38D-38F), and serrate 3 (38G-38I), in accordance with an embodiment of the present invention FIGS. 39A-I are diagrams of exemplary inserts in accordance with an embodiment of the present invention, particularly showing multiple insert blade.

FIGS. 40A-F are diagrams of exemplary inserts in accordance with an embodiment of the present invention, particularly showing an STIC curved/concave insert blade.

Figure 41:
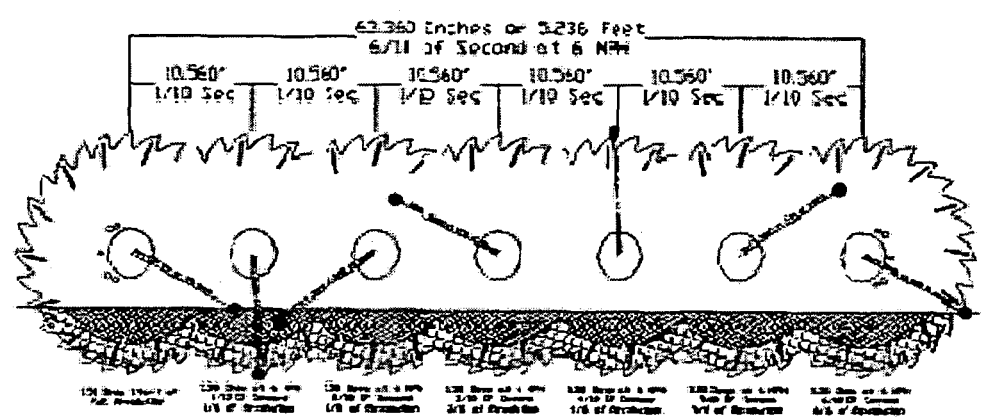
FIG. 41 is a diagram of an exemplary blade traveling at a speed of six miles per hour and associated snapshots every 1/10th second in accordance with an embodiment of the present invention.

FIG. 41 is a diagram of an exemplary blade traveling at a speed of six miles per hour and associated snapshots every ¹⁄₁₀th second in accordance with an embodiment of the present invention. An exemplary blade travels at a speed of six miles per hour and associated snapshots every ¹⁄₁₀th second in accordance with an embodiment of the present invention. Indicated rotation of the blade is preferably from right to left with the sabre shape of the blade impacting and cutting the stubble on the surface of the soil. As each insert enters the soil, the following insert enters and brings to the surface, the material fractured by the previous insert. The rotational action of the following insert thereby fractures and brings to the surface an amount of soil with which the preceding insert previously interacted. Additionally, soil proximal to the insert may also be fractured and brought to the surface due to energy transferred from the insert to the adjacent soil.

Figure 42:
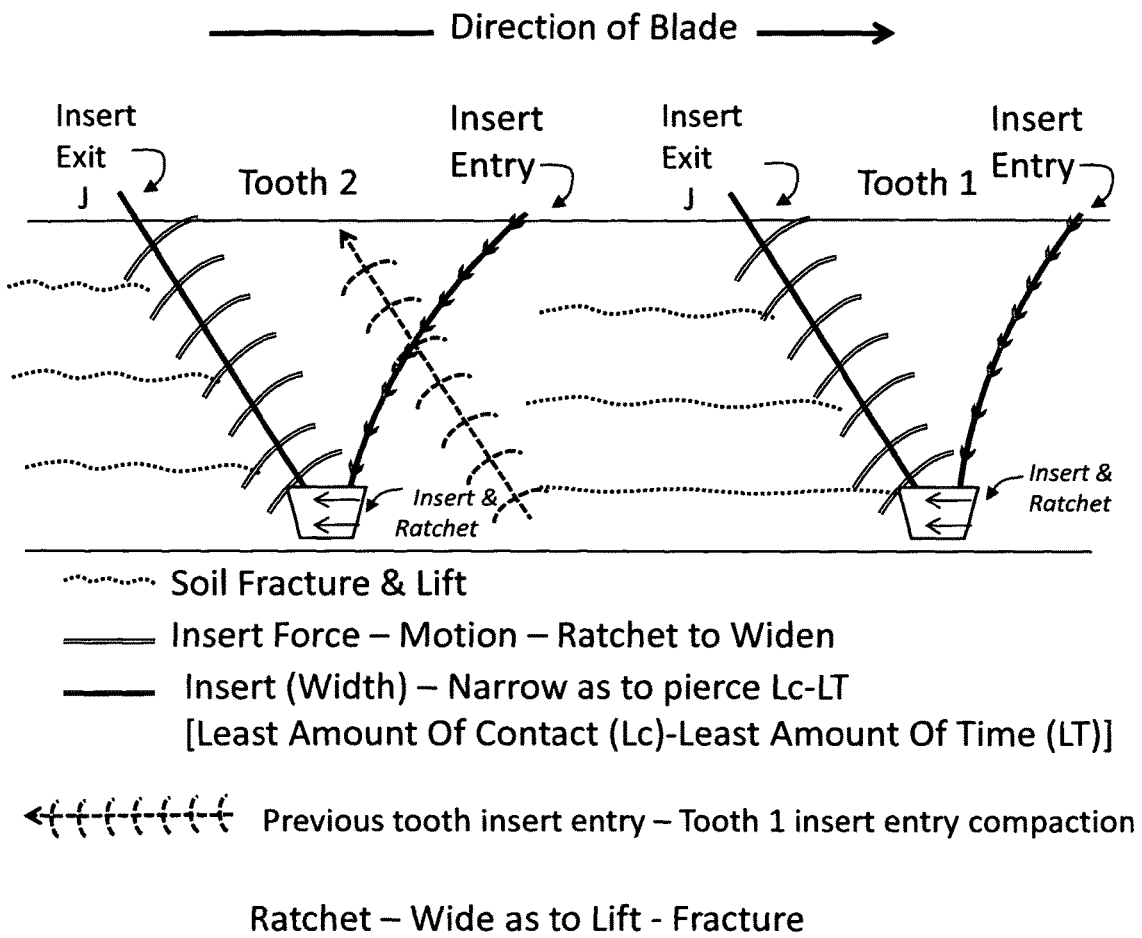
FIG. 42 is a diagram of an insert soil profile example in accordance with an embodiment of the present invention.

FIG. 42 is a diagram of an insert soil profile example in accordance with an embodiment of the present invention.

Figures 28A, 28B, 28C:
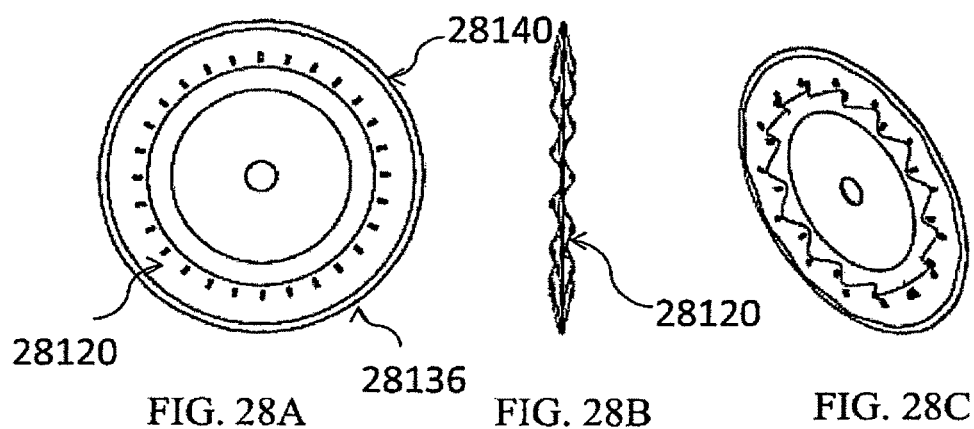
FIGS. 28A-I are diagrams of exemplary inserts in accordance with an embodiment of the present invention, particularly showing a bubble blade insert.
Figures 28D, 28E, 28F:
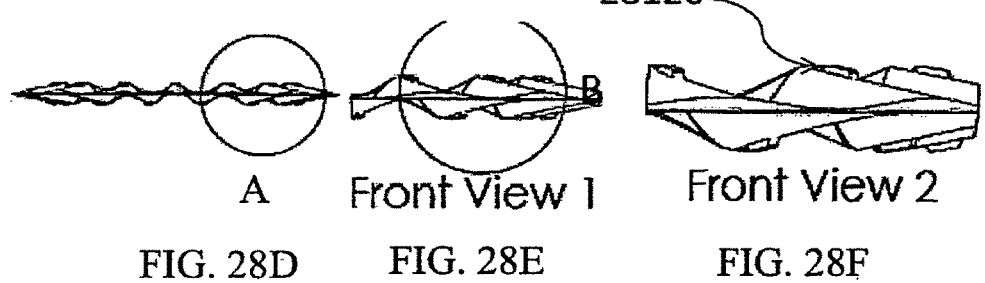
Figures 28G, 28H, 28I:
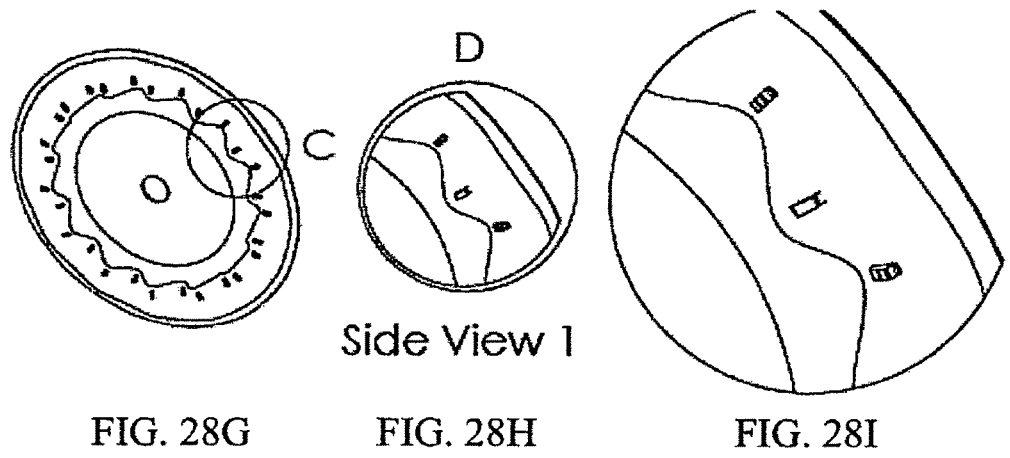
Figure 43A:
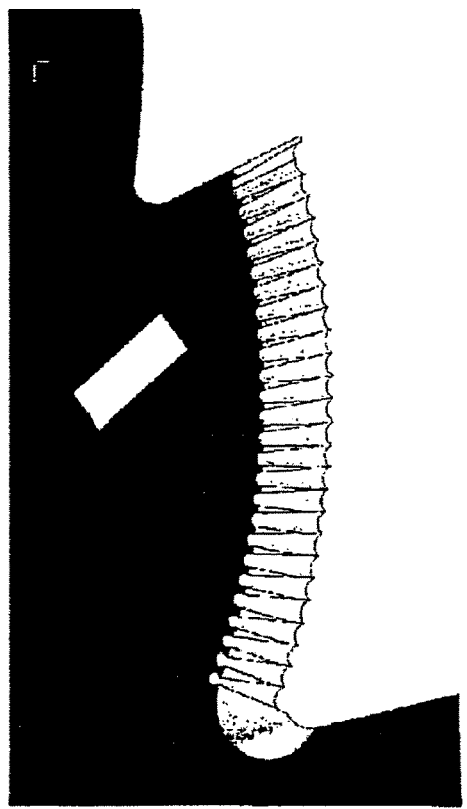
FIGS. 43A and 43B are exemplary images of serrated edge embodiments in accordance with an embodiment of the present invention.
Figure 43B:
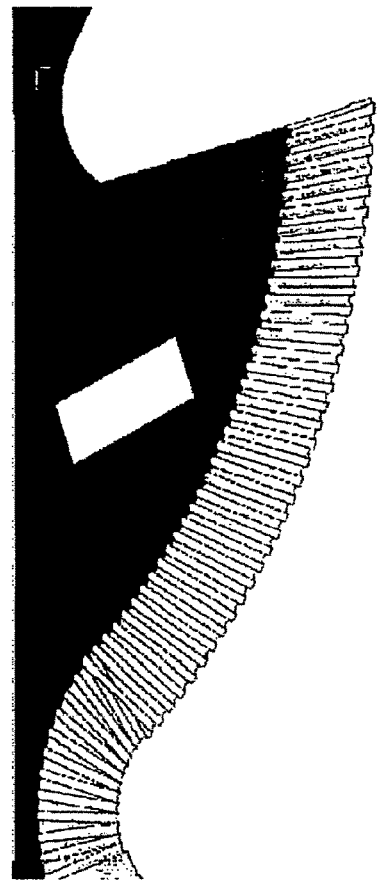

FIGS. 28A and 43B are exemplary images of serrated edge embodiments in accordance with an embodiment of the present invention.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to,"

"operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A coulter blade for altering soil and surface stubble, comprising:
   a discoidal coulter blade configured with a blade hub and a blade circumference, the coulter blade having a first lateral side and a second lateral side, the first lateral side and the second lateral side being planar and extending from the blade hub to the blade circumference and being parallel with one another, the blade hub configured for detachably mounting the discoidal coulter blade to an implement;
   a plurality of teeth configured proximal to and integral with the blade circumference, each one of the plurality of teeth having a rounded gullet adjacent thereto, each one of the plurality of teeth and gullet having a cutting edge and a back edge extending toward the blade circumference to an upward point so that each one of the plurality of teeth forms an upward saber shape for piercing the soil and rotating the discoidal coulter blade, the back edge longitudinally opposite the cutting edge, the cutting edge and the back edge extending away from the blade circumference continuing to its adjacent gullet, the cutting edge configured to cut the surface stubble and the soil, the back edge configured for rotationally driving the discoidal coulter blade parallel to the surface as the soil acts on the back edge, the gullet being rounded to continue the cut begun by the cutting edge;
   the cutting edge of a first half of the plurality of teeth and the gullet adjacent thereto being sharpened on a first lateral side and the cutting edge of a second half of the plurality of teeth and the gullet adjacent thereto being sharpened on a second lateral side, each tooth of the first half having two teeth of the second half planarly adjacent and each tooth of the second half having two teeth of the first half planarly adjacent thereby resulting in an opposing tooth bevel pattern and tooth bevel angle;
   wherein the plurality of teeth is adapted to drive the coulter blade in a forward motion altering soil and surface stubble while simultaneously mulching, tiling and aerating the soil.

2. The coulter blade for altering soil and surface stubble of claim 1 wherein the gullet has an angle.

3. The coulter blade for altering soil and surface stubble of claim 1 wherein the gullet has a serrated edge.

4. The coulter blade for altering soil and surface stubble of claim 1, further including:
   a plurality of evenly spaced insert openings configured in a circular pattern at a first radius from the blade hub, the first radius being less than the blade circumference, each of the plurality of evenly spaced insert openings having an insert angle;

a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts being configured to extend, from the discoidal coulter blade, a lateral distance normal to the plane, the plurality of inserts configured to alter the soil as a portion of the insert, which extends the lateral distance, rotationally and translationally interacts with the soil.

5. The coulter blade for altering soil and surface stubble of claim 4, wherein the insert angle of each of plurality of evenly spaced insert openings is one of: equal and unequal.

6. The coulter blade for altering soil and surface stubble of claim 4, wherein the discoidal coulter blade is further configured with a second plurality of evenly spaced insert openings and an associated second plurality of securably mounted inserts located in a circular pattern at a second radius from the blade hub, the second radius less than the first radius.

7. The coulter blade for altering soil and surface stubble of claim 4, wherein the plurality of inserts is further configured for at least one of: a specific soil type, a soil moisture content, a soil with embedded rocks, and a soil temperature.

8. The coulter blade for altering soil and surface stubble of claim 4, wherein the plurality of inserts is further configured for extracting a portion of soil with which the plurality of inserts interacts from a subsurface to a surface of the soil.

9. The coulter blade for altering soil and surface stubble of claim 4, wherein the inserts are seriated inserts.

10. The coulter blade for altering soil and surface stubble of claim 1, wherein the discoidal coulter blade is further configured with a plurality of insert openings.

11. The coulter blade for altering soil and surface stubble of claim 10, wherein the discoidal coulter blade is further configured with a plurality of securably mountable inserts.

12. The coulter blade for altering soil and surface stubble of claim 1 comprising a plurality of securably mountable inserts configured to be securably mounted onto said discoidal coulter blade through mounting means, each one of the plurality of inserts being configured to extend from the discoidal coulter blade a lateral distance normal to the plane, the plurality of inserts configured to alter the soil as a portion of the insert, which extends the lateral distance, rotationally and translationally interacts with the soil.

13. The coulter blade for altering soil and surface stubble of claim 12, wherein the mounting means for mounting the plurality of securably mountable inserts is selected from the group consisting of glued, fused, sweated, heat treated, coated or welded, inset, multiple stamped protrusions, snapped on or twist locked, pressure fitted or slide locked.

14. The coulter blade for altering soil and surface stubble of claim 12, wherein the plurality of securably mountable inserts are applied on a single side of the discoidal coulter blade.

15. The coulter blade for altering soil and surface stubble of claim 12, wherein the plurality of securably mountable inserts are applied on each side of the discoidal coulter blade so that the discoidal coulter blade has double sided with the inserts.

16. The coulter blade for altering soil and surface stubble of claim 1, wherein the discoidal coulter blade has a substantially flat shape.

17. The coulter blade for altering soil and surface stubble of claim 1, wherein the back edge of the tooth is specifically shaped to pull the coulter blade into the soil and maintain the rotation of the coulter blade.

18. The coulter blade for altering soil and surface stubble of claim 17, wherein the back edge of the tooth has a straight edge.

19. The coulter blade for altering soil and surface stubble of claim 17, wherein the back edge of the tooth has a curved edge.

20. The coulter blade for altering soil and surface stubble of claim 17, wherein the tooth is a cupped or beveled tooth with a concave edge forming a sabre/saber adapted to provide a sharp tooth resulting in less down pressure.

21. The coulter blade for altering soil and surface stubble of claim 1, wherein the tooth is self-sharpening for geometrical maintenance of the tooth geometry through use as the tooth moves through soil.

22. The coulter blade for altering soil and surface stubble of claim 1, wherein the discoidal coulter blade is adapted for use in agricultural processes selected from the group consisting of seeding, planting, tilling, fertilization, and cover crops.

23. The coulter blade for altering soil and surface stubble of claim 1, wherein the blade circumference is based at least on one of: a desired rotation, speed, a soil type, a desired tooth depth, a desired insert depth.

24. The coulter blade for altering soil and surface stubble of claim 1, wherein the discoidal coulter blade is further configured with a plurality of drive openings proximal with the blade hub.

25. The coulter blade for altering soil and surface stubble of claim 1, wherein the plurality of teeth is further configured for at least one of: a specific soil type, a soil moisture content, a soil with embedded rocks, and a soil temperature.

26. The coulter blade for altering soil and surface stubble of claim 1, wherein the cutting edge is serrated.

27. The coulter blade for altering soil and surface stubble of claim 1, wherein the teeth have a serrated edge.

28. The coulter blade for altering soil and surface stubble of claim 1 comprising multiple insert blades.

29. A coulter blade for altering soil and surface stubble, comprising:

a discoidal coulter blade configured with a blade hub and a blade circumference, the coulter blade having a first lateral side and a second lateral side, the first lateral side and the second lateral side being planar and extending from the blade hub to the blade circumference and being parallel with one another, the blade hub configured for detachably mounting the discoidal coulter blade to an implement;

a plurality of teeth configured proximal to and integral with the blade circumference, each one of the plurality of teeth having a rounded gullet adjacent thereto, each one of the plurality of teeth and gullet having a cutting edge and a back edge extending toward the blade circumference to an upward point so that each one of the plurality of teeth forms an upward saber shape for piercing the soil and rotating the discoidal coulter blade, the back edge longitudinally opposite the cutting edge, the cutting edge and the back edge extending away from the blade circumference continuing to its adjacent gullet, the cutting edge configured to cut the surface stubble and the soil, the back edge configured for rotatinally driving the discoidal coulter blade parallel to the surface as the soil acts on the back edge, the gullet being rounded to continue the cut begun by the cutting edge;

a plurality of evenly spaced insert openings configured in a circular pattern at a first radius from the blade hub and ending at a second radius from the blade hub, the first radius and the second radius being less than the blade circumference, each of the plurality of evenly spaced insert openings having an insert angle;

a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

30. A coulter blade for altering soil and surface stubble, comprising:

a discoidal coulter blade configured with a blade hub and a blade circumference, the coulter blade having a first lateral side and a second lateral side, the first lateral side and the second lateral side being planar and extending from the blade hub to the blade circumference and being parallel with one another, the blade hub configured for detachably mounting the discoidal coulter blade to an implement;

a plurality of teeth with rounded gullets, each one of the plurality of teeth and gullet having a cutting edge and a back edge extending toward the blade circumference to an upward point so that each one of the plurality of teeth forms an upward saber shape for piercing the soil and rotating the discoidal coulter blade, the back edge longitudinally opposite the cutting edge, the cutting edge and the back edge extending away from the blade circumference continuing to its adjacent gullet, the cutting edge configured to cut the surface stubble and the soil, the back edge configured for rotationally driving the discoidal coulter blade parallel to the surface as the soil acts on the back edge;

a plurality of evenly spaced insert openings configured in a circular pattern at a first radius from the blade hub and ending at a second radius from the blade hub, the first radius and the second radius being less than the blade circumference, each of the plurality of evenly spaced insert openings having an insert angle;

a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the blade circumference, the plurality of inserts configured to alter the soil as a portion of the insert, which extends the lateral distance, rotationally and translationally interacts with the soil.

31. A method for altering surface stubble and soil aeration utilizing concentrated friction and force in forward rotation and forward motion, comprising:

embedding a discoidal coulter blade within the soil, the discoidal coulter blade configured with a blade hub and a blade circumference, the coulter blade having a first lateral side and a second lateral side, the first lateral side and the second lateral side being planar and extending from the blade hub to the blade circumference and being parallel with one another, the blade hub configured for detachably mounting the discoidal coulter blade to an implement;

translating the discoidal coulter blade through the soil at a depth via the implement;

cutting the surface stubble and soil via a plurality of teeth configured proximal to and integral with the blade circumference, each one of the plurality of teeth having a rounded gullet adjacent thereto, each one of the plurality of teeth and gullet having a cutting edge and a back edge extending toward the blade circumference to an upward point so that each one of the plurality of teeth forms an upward saber shape for piercing the soil and rotating the discoidal coulter blade, the back edge being longitudinally opposite the cutting edge and terminating at a fillet or gullet, the cutting edge and the back edge extending away from the blade circumference continuing to its adjacent gullet, the cutting edge configured to cut the surface stubble and the soil, the back edge configured for rotatinally driving the discoidal coulter blade parallel to the surface as the soil acts on the back edge, the gullet being rounded to continue the cut begun by the cutting edge, the teeth comprising a fillet or gullet located planarly adjacent to and between each of the teeth;

wherein the plurality of teeth is adapted to drive the coulter blade in a forward motion altering soil and surface stubble while simultaneously mulching, tiling and aerating the soil.

32. The method for altering surface stubble and soil aeration of claim 31, further including aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts being configured to extend, from the discoidal coulter blade, a lateral distance normal to the plane, the plurality of inserts configured to alter the soil as a portion of the insert, which extends the lateral distance, rotationally and translationally interacts with the soil.

33. The method for altering surface stubble and soil aeration of claim 31, wherein the cutting edge of a first half of the plurality of teeth is sharpened on a first lateral side and the cutting edge of a second half of the plurality of teeth is sharpened on a second lateral side, each tooth of the first half having two teeth of the second half planarly adjacent and each tooth of the second half having two teeth of the first half planarly adjacent thereby resulting in an opposing tooth bevel pattern and tooth bevel angle.

34. The method for altering surface stubble and soil aeration of claim 31, wherein the blade circumference is based at least on one of: a desired rotation speed, a soil type, a desired tooth depth, a desired insert depth.

35. The method for altering surface stubble and soil aeration of claim 31, wherein the discoidal coulter blade is further configured with a plurality of drive openings proximal with the blade hub.

36. The method for altering surface stubble and soil aeration of claim 32, wherein the insert angle of each of plurality of evenly spaced insert openings is one of: equal and unequal.

37. The method for altering surface stubble and soil aeration of claim 32, wherein the discoidal coulter blade is further configured with a second plurality of evenly spaced insert openings and an associated second plurality of securably mounted inserts located in a circular pattern at a second radius from the blade hub, the second radius less than the first radius.

38. The method for altering surface stubble and soil aeration of claim 31, wherein the plurality of teeth are further configured for at least one of: a specific soil type, a soil moisture content, a soil with embedded rocks, and a soil temperature.

39. The method for altering surface stubble and soil aeration of claim 31, wherein the plurality of inserts are further configured for at least one of: a specific soil type, a soil moisture content, a soil with embedded rocks, and a soil temperature.

40. A method for treating soil adapted to alter surface stubble and soil aeration, comprising:
embedding a discoidal coulter blade with tooth and gullet geometry within the soil, said tooth and gullet geometry comprising a plurality of teeth with rounded gullets, each one of the plurality of teeth having a rounded gullet adjacent thereto, the discoidal coulter blade configured with a blade hub and a blade circumference, the coulter blade having a first lateral side and a second lateral side, the first lateral side and the second lateral side being planar and extending from the blade hub to the blade circumference and being parallel with one another, the blade hub configured for detachably mounting the discoidal coulter blade to an implement, said tooth and gullet geometry comprising:
a cutting edge and a back edge extending toward the blade circumference to an upward point so that each one of the plurality of teeth forms an upward saber shape for piercing the soil and rotating the discoidal coulter blade, the back edge the back edge longitudinally opposite the cutting edge, the cutting edge and the back edge extending away from the blade circumference continuing to its adjacent gullet, the cutting edge configured to cut the surface stubble and the soil, the back edge configured for rotatinally driving the discoidal coulter blade parallel to the surface as the soil acts on the back edge;
translating the discoidal coulter blade through the soil at a depth via the implement;
rotating of the discoidal coulter blade by way of forward tooth rotation with an upward point, upward multiple angles or upward sabers on said back edge along with slicing;
cutting the surface stubble and soil via the plurality of teeth, the cutting edge configured to cut the surface stubble and the soil, the back edge configured for driving the discoidal coulter blade rotationally parallel to the plane as the soil acts on the back edge, the teeth comprising a fillet or gullet located planarly adjacent to and between each of the teeth;
wherein the plurality of teeth is adapted to drive the coulter blade in a forward motion altering soil and surface stubble while simultaneously mulching, tiling and aerating the soil.

\* \* \* \* \*